United States Patent [19]

Okuno et al.

[11] Patent Number: 5,247,594
[45] Date of Patent: Sep. 21, 1993

[54] WAVEGUIDE-TYPE OPTICAL MATRIX SWITCH

[75] Inventors: Masayuki Okuno, Mito; Kuniharu Kato, Naka; Katsumi Katoh, Katsuta; Masao Kawachi, Mito, all of Japan

[73] Assignee: Nippon Telegraph and Telephone Corporation, Tokyo, Japan

[21] Appl. No.: 853,989

[22] Filed: Mar. 20, 1992

[30] Foreign Application Priority Data

Mar. 22, 1991 [JP] Japan ............................ 3-81232

[51] Int. Cl.$^5$ ............................................ G02B 6/26
[52] U.S. Cl. ........................................ 385/17; 385/16; 385/20; 385/40; 385/41
[58] Field of Search ............... 385/17, 16, 18, 19, 385/20, 21, 22, 24, 40, 41

[56] References Cited

U.S. PATENT DOCUMENTS

| | | | |
|---|---|---|---|
| 4,142,775 | 3/1979 | Ramaswamy et al. | 385/41 |
| 4,618,210 | 10/1986 | Kondo | 385/17 |
| 4,693,547 | 9/1987 | Soref et al. | 385/17 X |
| 4,818,050 | 4/1989 | Duthie | 385/17 |

FOREIGN PATENT DOCUMENTS 3-228494 9/1991 Japan .

OTHER PUBLICATIONS

Experimental Photonic Multimedia Switching System Using Integrated 8×8 Silica-Based Guided-Wave Crossbar Switch 1990.
Strictly Nonblocking 8×8 Integrated Optical Matrix Switch with Silica-Based Waveguides on Silicon Substrate.
C-171-Wavelength Dependency of Silica-Based Thermo-optic 8×8 Matrix Switch 1991.

*Primary Examiner*—John D. Lee
*Assistant Examiner*—Phan T. Heartney
*Attorney, Agent, or Firm*—Kenyon & Kenyon

[57] ABSTRACT

A waveguide-type optical matrix switch including as its switching element a Mach-Zehnder interferometer which includes two directional couplers and an optical phase shifter. The two directional couplers are arranged by placing two optical waveguides in close proximity at two positions on a substrate, and have an identical coupling ratio. The optical phase shifter is disposed over at least one of the two optical waveguides between the directional couplers. The two optical waveguides have an effective optical path length difference of half a wavelength of a light signal between the two directional couplers, and are intersected in the optical switch element. The waveguide-type optical matrix switch is little affected by fabrication errors in the coupling ratio of the directional couplers, and superior in the extinction ratio.

29 Claims, 20 Drawing Sheets

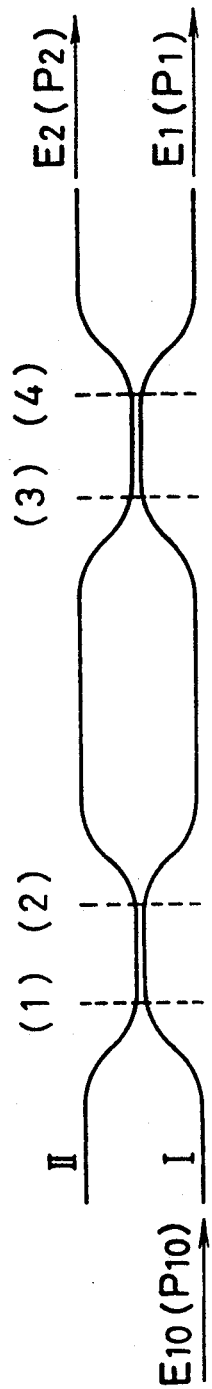
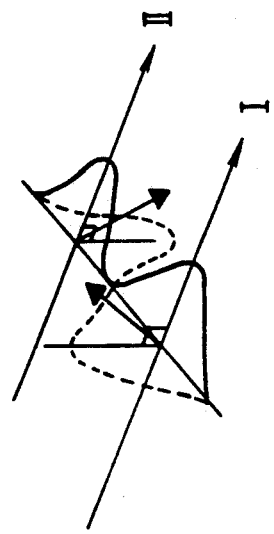
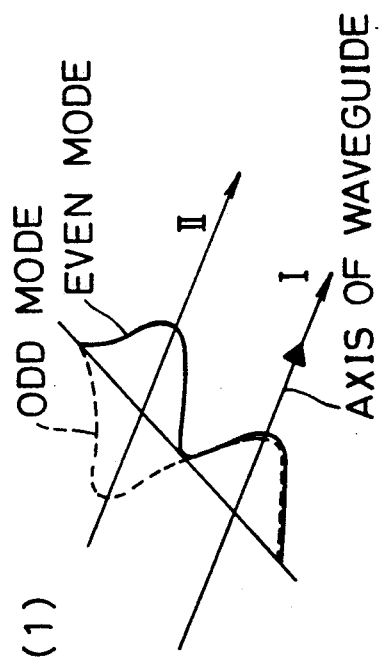
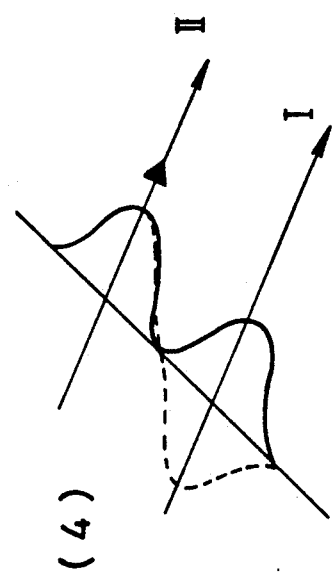
FIG.4A (PRIOR ART)
FIG.4B
FIG.4C
FIG.4D (PRIOR ART)

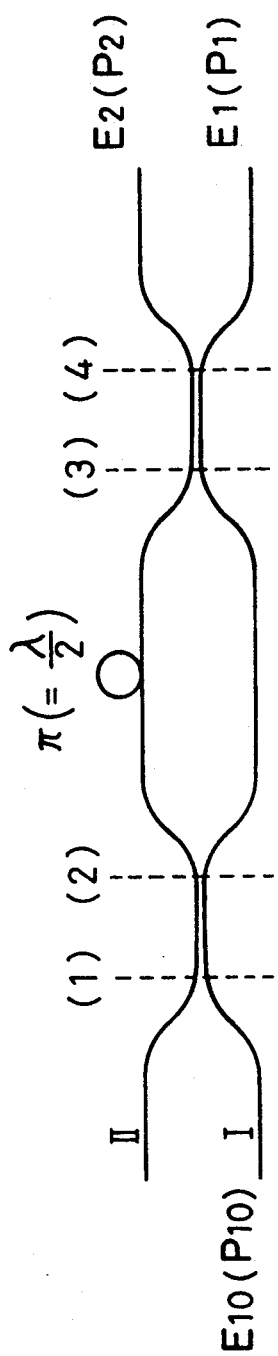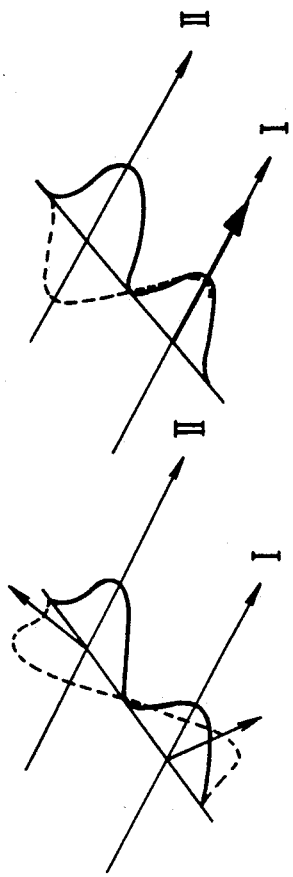
FIG.5A  FIG.5B  FIG.5C

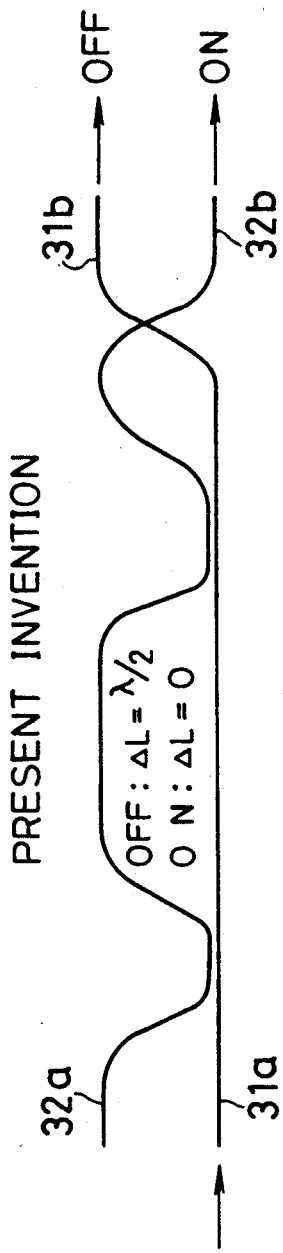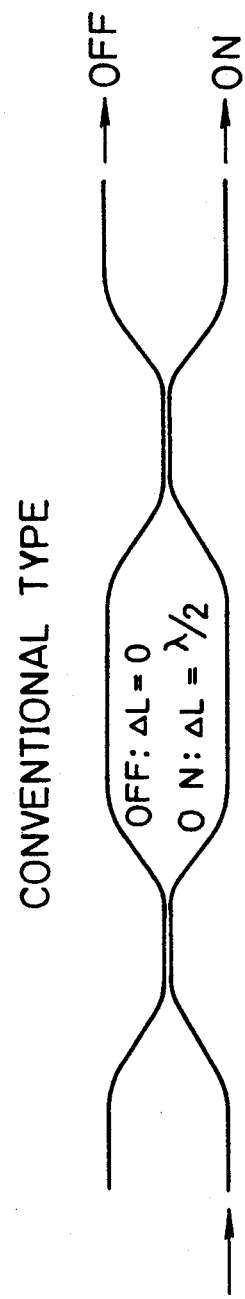
FIG. 8A
FIG. 8B (PRIOR ART)

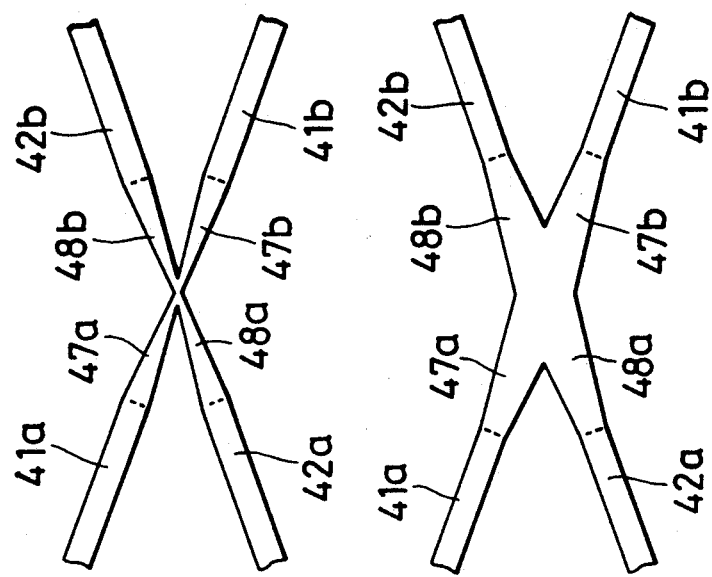
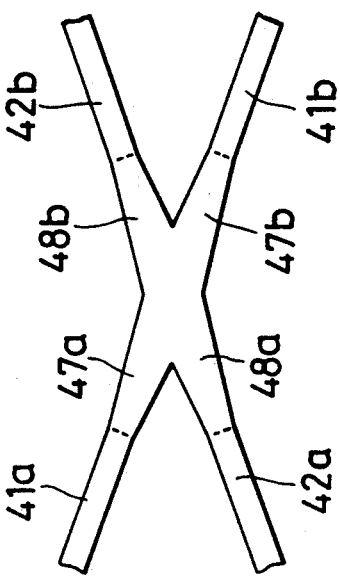
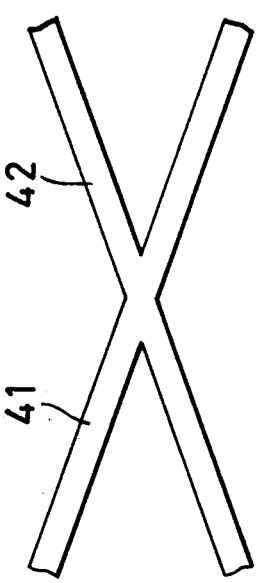
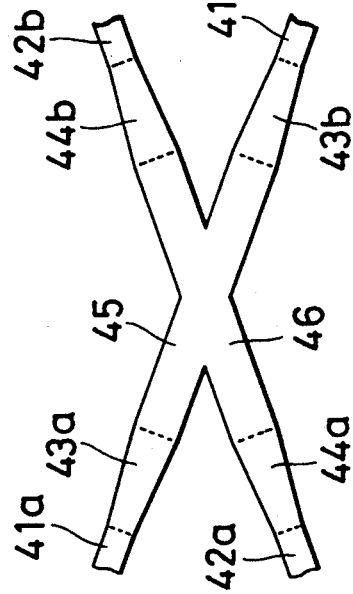
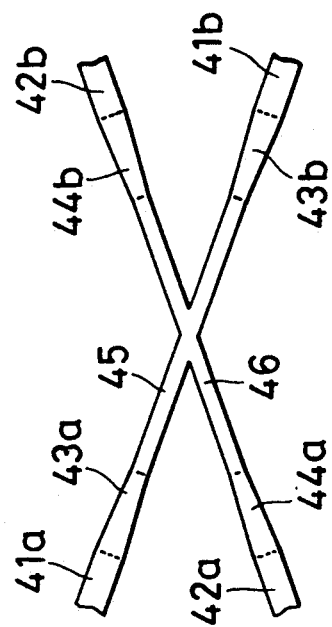

WAVEGUIDE-TYPE OPTICAL MATRIX SWITCH

BACKGROUND OF THE INVENTION

1. Field of the Invention

The present invention relates to a waveguide-type optical matrix switch used in optical fiber communications, and more particularly, to a waveguide-type optical matrix switch which is little affected by fabrication errors, and has a high extinction ratio.

2. Description of the Prior Art

Recently, it has become essential for further spread of the optical fiber communications to develop optical circuit components such as optical splitters and couplers, optical multi/demultiplexers and optical switches in addition to the realization of higher performance and lower cost optical fibers, photo-detectors and emitters. Above all, optical switches are considered to play an important role in near future to freely switch optical fiber lines in response to demands or to establish alternate routes in case of line faults.

As typical optical switch configurations, bulk-type and waveguide-type optical switches have been proposed. The bulk type optical switch is arranged by employing a movable prism and lenses as its parts, and has advantages that it has small wavelength dependence, and relatively low loss characteristics. The bulk-type optical switches, however, have not much spread because they are not suitable for mass production since their assembly and adjusting processes are complicated and expensive. On the other hand, the waveguide-type optical switches, which are mass-produced in the form of so-called integrated optical switches by utilizing the photolithography and fine pattern fabrication technique, are considered as a future-type optical switch. In particular, the waveguide-type optical switch is considered essential to realize a practical, rather large-scale $M \times N$ optical matrix switch having M input ports and N output ports.

FIG. 1 is a schematic diagram showing an arrangement of a $4 \times 4$ optical switch as an example of an $M \times N$ optical matrix switch that will become the subject matter of the present invention. The $4 \times 4$ matrix switch are arranged in such a fashion that four input optical waveguides 1a, 1b, 1c and 1d intersect four output optical waveguides 2a, 2b, 2c and 2d at 16 places. Each of these 16 places is provided with a $2 \times 2$ optical switch elements S00, . . . , or S33 as a minimum unit optical switch. Such an arrangement of the optical matrix switch is called "a strictly non-blocking optical matrix switch", and can switch four-channel light signals entering the input optical waveguides 1a, 1b, 1c and 1d to any one of the four output optical waveguides 2a, 2b, 2c and 2d.

For example, when a light signal incident to the input optical waveguide 1a is to be outputted from the output optical waveguide 2b, an optical path passing through the optical switch elements S03, S02, S01, S11, S21 and S31 is formed. In this case, in the optical switch element S01, a bar path is established which guides a light beam incident to the bottom left waveguide to the bottom right waveguide. In the other switch elements, a cross path is established which guides a light beam incident to the bottom left waveguide (or to the top left waveguide) to the top right waveguide (or to the bottom right waveguide). To minimize the number of driven switch elements, it is necessary to establish a cross path when an optical switch element is in the OFF state, and a bar path when an optical switch element is in the ON state. In the above-mentioned example, only the switch element S01 is made ON state, and the other switch elements are made OFF state. This holds true for any other optical paths. For example, an optical path from the input optical waveguide 1a to the output optical waveguide 2a can be established by making the optical switch element S00 ON, and the other optical switch elements S03, S02, S01, S10, S20 and S30 OFF. Thus, the number of the optical switch element to be made ON to form a bar path is always one, whereas that of the optical switch elements to be made OFF to form a cross path varies from zero to six. In other words, in the $4 \times 4$ optical matrix switch, the number of the optical switch elements through which the light signal passes varies from a minimum of one to a maximum of seven.

Many attempts have been conducted to constitute the optical matrix switch by using optical waveguides of various kinds of materials. Above all, a thermooptic matrix switch utilizing thermooptic effect of silica-based optical waveguide on a silicon substrate is expected as the most promising candidate of the practical optical matrix switches because it has no unfavorable polarization dependence, and has good joining characteristics to optical fibers.

FIG. 2A is a plan view showing the entire arrangement of a conventional thermooptic $4 \times 4$ optical matrix switch constructed on a silicon substrate as an example corresponding to the $4 \times 4$ optical matrix switch as shown in FIG. 1, and FIG. 2B is an enlarged plan view showing an arrangement of a conventional optical switch element of FIG. 2A. In these figures, eight optical waveguides including the four input optical waveguides 1a, 1b, 1c and 1d constitute an input waveguide bundle 4a, and eight optical waveguides including the four output optical waveguides 2a, 2b, 2c and 2d constitute an output waveguide bundle 4b. It is easily understood that the arrangement of FIG. 2A is topologically equal to that of FIG. 1.

These waveguide bundles 4a and 4b are silica-based single-mode optical waveguide arrays formed on a substrate 3 by a known combination of the frame-hydrolysis deposition and the reactive ion etching technique. Each of the switch elements S00-S33 disposed at each one of the sixteen positions is a so-called Mach-Zehnder interferometer type $2 \times 2$ optical switch as shown in FIG. 2B.

In FIG. 2B, two optical waveguides 61a-61b and 62a-62b are placed in close proximity at two positions to form two directional couplers 63a and 63b. The coupling ratio of the directional couplers is set at 50% at the wavelength of a light signal. The optical path lengths of the two optical waveguides 61a-61b and 62a-62b between the two directional couplers 63a and 63b are set at an identical length (a symmetrical state) when thermooptic phase shifters 64a and 64b, which are made of thin film heaters and are disposed over the two optical waveguides, are not operated (in the OFF state).

Assuming that the power coupling ratio of the directional couplers 63a and 63b is k, the power of an input light signal to one optical waveguide is P10, the powers of output light signals from the bar path and the cross path are P1 and P2, respectively, and the phase difference taking place between the two waveguides connecting the two directional couplers 63a and 63b is $\Delta\phi$, the input and output switching characteristics of the Mach-Zehnder $2 \times 2$ optical switch element can be expressed by the following equations:

$$P_1/P_{10} = (1-2k)^2 \cos^2(\Delta\phi/2) + \sin^2(\Delta\phi/2) \quad (1)$$

$$P_2/P_{10} = 4k(1-k)\cos^2(\Delta\phi/2) \quad (2)$$

When the coupling ratio $k=\frac{1}{2}$, that is, when the directional couplers 63a and 63b are a 3-dB coupler, the input-output characteristics are as follows: First, when the switch is in the OFF state where the thin film heaters 64a and 64b are not supplied with power, the phase difference $\Delta\phi$ is zero, and hence, the light signal is transmitted through the cross path, that is, through the path 61a–62b or 62a–61b. On the other hand, when at least one of the phase shifters 64a and 64b is made ON by applying power to the thin film heater, the optical path length difference of $\frac{1}{2}$ wavelength corresponding to $\pi$ radian is produced between the two waveguides connecting the directional couplers. The phase difference $\Delta\phi$ of $\pi$ thus produced switches the optical switch element into the bar state so that the light signal is transmitted through the bar path 61a–61b or 62a–62b. In this way, switching between the cross/bar states of the optical switch element is achieved. The conventional waveguide-type optical matrix switch using the 2×2 optical switch elements with such an arrangement as a basic element, however, presents the following problem in a fabrication process:

Although the coupling ratio of the directional couplers 63a and 63b must be exactly 50% at the wavelength of the light signal so as to achieve an ideal operation of the conventional Mach-Zehnder interferometer type optical switch element of FIG. 2B, it is difficult to set the coupling ratio at exactly 50% because some errors are inevitably involved in a practical fabrication process of the optical waveguides. This is because directional couplers are a very structure-sensitive optical device, and hence, the coupling ratio is readily varied by a width of the waveguides, by the separation between the two waveguides, and by very small process errors of the relative refractive index difference between the core and cladding of the waveguides, or the like.

When the coupling ratio of the directional couplers deviates from 50%, the light signal is not transmitted in its entirety through the cross path 61a–62b or 62a–61b in the OFF state, but leaks out of the cross path and enters the bar path 61a–61b or 62a–62b. In other words, so-called crosstalk takes place. This is an important problem to be solved in the fabrication process of the waveguide-type optical matrix switch.

For example, when the coupling ratio deviates from 50% upward or downward by 5%, approximately 1% of the light signal power leaks to the bar path 61a–61b or 62a–62b in each optical switch element so that only 15 dB extinction ratio can be achieved in the 4×4 optical matrix switch as shown in FIG. 2A. This becomes more serious as the scale of the matrix increases. In an 8×8 optical matrix switch, for example, the crosstalk characteristics deteriorates, and the extinction ratio declines to approximately 11 dB.

In a practical fabrication process of the optical waveguides, errors of approximately ±5% commonly take place, and even errors on the order of ±10% are not rare in setting the coupling ratio of the directional couplers at 50%. Thus, the coupling ratio sensitivity of the waveguide-type optical matrix switch has been one of the most important problems in fabricating it with a high yield.

SUMMARY OF THE INVENTION

Accordingly, it is an object of the present invention to provide a waveguide-type optical matrix switch that can tolerate larger coupling errors of directional couplers and has a higher extinction ratio by eliminating the above-described disadvantages associated with the conventional techniques.

In a first aspect of the present invention, there is provided a waveguide-type optical switch for switching a light signal inputted thereto, comprising:

a substrate;

two directional couplers arranged by placing two optical waveguides in close proximity at two positions on the substrate, and having an identical coupling ratio, the two optical waveguides having an effective optical path length difference of half a wavelength of the light signal between the two directional couplers;

optical path length switching means disposed over at least one of the two optical waveguides between the two directional couplers for switching the effective optical path length difference to an integral multiple of the wavelength of the light signal; and a cross portion at which the two optical waveguides are intersected.

Here, the optical path length switching means may be an optical phase shifter.

In a second aspect of the present invention, there is provided a waveguide-type optical matrix switch having a plurality of input ports, and a plurality of output ports, and switching a light signal inputted to one the input ports to be produced from one of the output ports, the waveguide-type optical matrix switch comprising:

a plurality of input optical waveguides each of which is connected to each one of the input ports;

a plurality of output optical waveguides each of which is connected to each one of the output ports; and a plurality of optical switch elements each of which is disposed at each one of intersections of the input optical waveguides and the output optical waveguides;

wherein each of the plurality of optical switch elements including:

a substrate;

two directional couplers arranged by placing two optical waveguides in close proximity at two positions on the substrate, and having an identical coupling ratio, the two optical waveguides having an effective optical path length difference of half a wavelength of the light signal between the two directional couplers;

optical path length switching means disposed over at least one of the two optical waveguides between the directional couplers for switching the effective optical path length difference to an integral multiple of the wavelength of the light signal; and a cross portion at which the two optical waveguides are intersected.

The optical path length switching means may be an optical phase shifter.

The optical phase shifter may be a thermooptic effect phase shifter consisting of a thin film heater.

The optical path length switching means may be two optical phase shifters each of which is disposed over each one of the two optical waveguides between the two directional couplers.

The optical phase shifter may be disposed over a shorter waveguide of the two optical waveguides so that the effective optical path length difference is made zero when the optical phase shifter is driven.

The optical phase shifter may be disposed over a longer waveguide of the two optical waveguides so that the effective optical path length difference is made one wavelength of the light signal when the optical phase shifter is driven.

One of the optical phase shifters may compensate for an offset of the effective optical path length difference when the effective path length difference deviates from half a wavelength of the light signal.

The cross portion may be disposed between the two directional couplers.

The two optical waveguides may intersect at the cross portion with a cross angle of at least 15 degrees.

The two optical waveguides may have tapered geometry in sections before and after the cross portion.

The two optical waveguides may have tapered geometry at the cross portion.

Each one of the two optical waveguides may be any one of a plastic waveguide, an ion-diffused glass waveguide, and a lithium niobate waveguide.

The optical switch elements may be connected by curved waveguide bundles to form a serpentine layout.

A waveguide-type optical switch may further comprise inactive switch elements placed at positions corresponding to the optical switch elements on the optical waveguides.

Each of the inactive switch element may comprise:

two directional couplers arranged by placing two optical waveguides in close proximity at two positions on the substrate, and having an identical coupling ratio, the two optical waveguides having an effective optical path length difference of half a wavelength of the light signal between the two directional couplers; and a cross portion at which the two optical waveguides are intersected.

Centers of the optical waveguides may be offset at portions where each of the optical waveguides changes its geometry from a straight to a curve, and where each of the optical waveguides changes its radius of curvature, or changes its direction of a curve.

A radius of curvature of a curve of the waveguides may be at least 4 mm.

According to the present invention, an optical path length difference of ½ wavelength is set in the OFF state between the two directional couplers of the Mach-Zehnder interferometer constituting the optical switch element. Thus, in the OFF state, the inputted light signal passes through the Mach-Zehnder interferometer without transferring to the other waveguide, that is, with maintaining the input state (in a through state). In addition, since the two waveguides cross in the switch element with an angle such that only negligible crosstalk will takes place, the light signal passes through the switch element in the cross path mode. These operations are accomplished as long as the coupling ratios of the two directional couplers are identical, regardless of their value.

On the other hand, in the ON state, the optical phase shifter disposed over the optical waveguide constituting the Mach-Zehnder interferometer is driven so as to cancel the optical path length difference of ½ wavelength. This enables the optical switch element including the cross portion to be switched to the bar path mode.

The waveguide-type optical matrix switch according to the present invention differs from the conventional optical matrix switch in that it employs a Mach-Zehnder interferometer structure including the optical path length difference of ½ wavelength in the OFF state, and that the optical switch element includes a cross portion of the waveguides in the switch element.

According to the present invention, the crosstalk to the bar path will not occur in the OFF state as long as the coupling ratios of the two directional couplers are equal even if the value of the coupling ratios deviates from 50%. When the value of the coupling ratios deviates from 50%, the light signal is not switched in its entirety to the bar path, leaving a small amount of the light signal in the cross path. The remaining light signal, however, is led to an unused waveguide terminal of the output waveguide bundle, and hence, the degradation of the extinction ratio of the optical matrix switch can be prevented.

Furthermore, when the cross portion is provided between the two directional couplers, the length of the switch element can be reduced to a minimum. This is because two positions where the separation of the two waveguides must be widen, that is, the section between the two directional couplers and a cross portion, can be unified. Thus, dimensions of the optical matrix switch formed by integrating many optical switch elements can be reduced.

In the waveguide-type optical matrix switch according to the present invention, even when the coupling ratios deviate from 50%, the light signal transmits a switch element in its entirety through the cross path in the OFF state as long as the two coupling ratios of the directional couplers in the switching element are identical. Therefore, precise adjustment required for fabricating the directional couplers can be greatly reduced, and the optical matrix switch with a high extinction ratio can be readily provided. In addition, in the optical matrix switch of the present invention comprising the switch elements can reduce the setting accuracy of the wavelength of the light signal, thus enabling to introduce a low cost, low wavelength accuracy signal source. The optical matrix switch of the present invention is expected to make a great contribution to constructing optical fiber communications systems in which a great number of light signals are communicated.

The above and other objects, effects, features and advantages of the present invention will become more apparent from the following description of the embodiments thereof taken in conjunction with the accompanying drawings.

BRIEF DESCRIPTION OF THE DRAWINGS

FIGS. 4A-4D are schematic diagrams showing behavior of electric fields at various stages of a conventional Mach-Zehnder interferometer type optical switch element;

FIGS. 5A-5C are schematic diagrams showing behavior of electric fields at various stages of a Mach-Zehnder interferometer type optical switch element according to the present invention;

FIG. 8A is a schematic diagram illustrating the ON state and OFF state characteristics of the Mach-Zehnder interferometer type optical switch element according to the present invention;

FIG. 8B is a schematic diagram illustrating the ON state and OFF state characteristics of the conventional Mach-Zehnder interferometer type optical switch element;

FIGS. 19A-19E are schematic plan views illustrating configurations of cross portions to reduce the cross loss.

DETAILED DESCRIPTION OF PREFERRED EMBODIMENTS

The invention will now be described with reference to the accompanying drawings. In the following embodiments, silica-based single-mode optical waveguides formed on a silicon substrate are used as optical waveguides, and thermooptic Mach-Zehnder interferometer type 2×2 optical switch devices are employed as optical switch elements of an optical matrix switch. This is because this combination is superior in joining to single-mode optical fibers, and can provide an optical matrix switch without polarization dependence. The present invention, however, is not restricted to this combination.

EMBODIMENT 1

Figure 1:
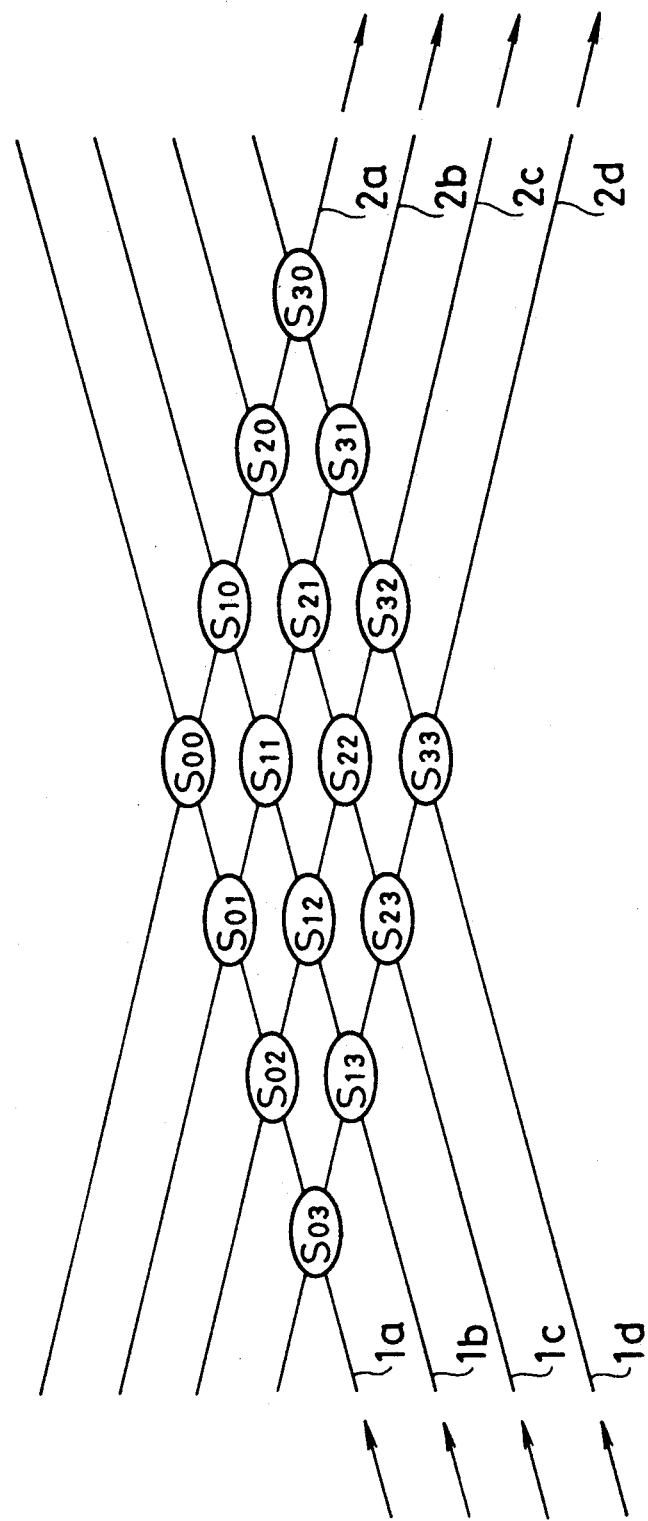
FIG. 1 is a schematic diagram illustrating an arrangement of a waveguide-type optical matrix switch.
Figure 3A:
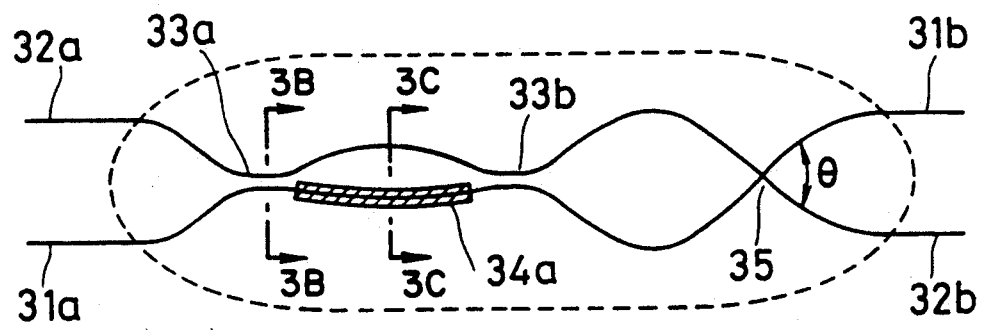
FIG. 3A is a plan view showing an arrangement of an optical switch element constituting a 4×4 optical matrix switch as a first embodiment of a waveguide-type optical matrix switch according to the present invention.
Figure 3B:
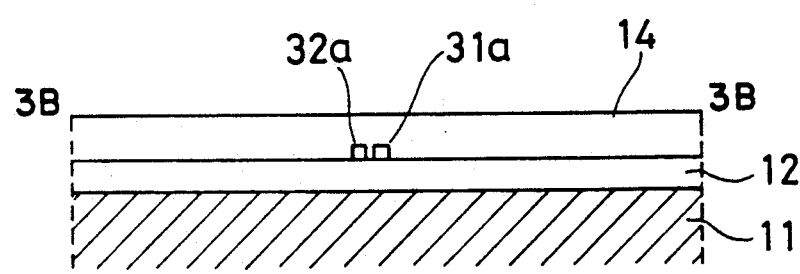
FIG. 3B is an enlarged cross-sectional view taken along line 3B—3B of FIG. 3A.
Figure 3C:
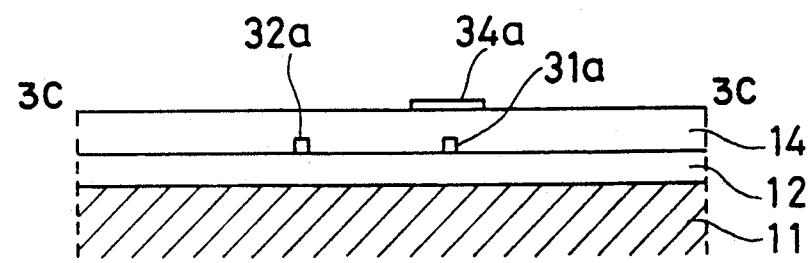
FIG. 3C is an enlarged cross-sectional view taken along line 3C—3C of FIG. 3A.

FIGS. 3A-3C show an arrangement of an optical switch element constituting a 4×4 optical matrix switch as a first embodiment of a waveguide-type optical matrix switch according to the present invention: FIG. 3A is a plan view; FIGS. 3B and 3C are enlarged cross-sectional views taken along lines 3B—3B and 3C—3C of FIG. 3A. A plan view showing the entire arrangement of the 4×4 optical matrix switch is identical to FIG. 1, and so it is omitted here. Two silica-based-glass optical waveguides 31a-31b and 32a-32b are placed in close proximity separated approximately several micrometers apart at two positions on a silicon substrate 11, thereby forming two directional couplers 33a and 33b as shown in FIGS. 3A and 3B. The coupling ratios of the directional couplers are set to become 50% by adjusting the separation of the waveguides at the coupling section and the coupling length. The effective optical path lenght of the optical waveguides 31a-31b and 32a-32b between the two directional couplers 33a and 33b are set such that the waveguide 32a-32b is longer than the waveguide 31a-31b by half the light signal wavelength of 1.3 μm, that is, by 0.65 μm. In addition, a thin film heater 34a is disposed on top of a cladding layer 14 in such a manner that the heater 34a is located just over the waveguide 31a-31b as shown in FIG. 3C. The waveguides 31a-31b and 32a-32b intersect with a cross angle of $\theta$ at a cross portion 35. The cross angle $\theta$ is set at such a value as crosstalk caused by the intersection is negligible.

The region between the directional couplers 33a and 33b constitutes a slightly asymmetric Mach-Zehnder interferometer having an optical path length difference of half a wavelength. In the OFF state when no current flows through the thin film heater 34a, a light signal inputted to the input port 31a of the waveguide 31a-31b passes through the directional couplers 33a and 33b being confined in the waveguide 31a-31b, and is outputted from the output port 31b. The light signal passing through the interferometer region intersects at the cross portion 35, and hence, the cross path can be achieved when the optical switch element is in the OFF state.

Here, the output state of the Mach-Zehnder interferometer is visually explained in terms of interference between the modes of the electric field when the optical path length difference of zero and $\lambda/2$ is given to the waveguide arms linking the two directional couplers.

The optical power transfer in the directional coupler sections can be expressed in terms of the interference between an even mode and an odd mode of the electric field, that is, in terms of the superimposition of the two modes. Each mode is represented in the real and imaginary space to express phase states.

FIGS. 4A–4D illustrate the mode behavior at various stages of the conventional switch element where the optical path length difference $\Delta L = 0$. Assuming that an incident light signal is $E_{10}$, the composite electric fields on the axes of the two waveguides are represented by vectors. The behavior of the light signal at positions (1)–(4) in FIG. 4A are as follows:

(1) It is supposed that the even mode and odd mode are in such a state as shown in FIG. 4B when the light signal is in the waveguide I: in the waveguide I, the two modes are in the same phase, and hence, they are added to each other; in the waveguide II, on the other hand, they are in opposite phase, and hence, they are canceled.

(2) Since the odd mode has a lower phase velocity (a smaller propagation constant) than the even mode, it rotates toward the imaginary axis when the even mode is supposed to be fixed on the real axis. When the phase difference between the two modes becomes 90°, the electric field intensities in the two waveguides become equal. Here, it should be noted that although the electric field intensities are equal, the phase leads 90° in the waveguide II as shown by the vectors of FIG. 4C.

(3) The state of (2) is maintained because there is no optical path length difference between the two waveguide arms linking the two directional couplers.

(4) When the light signal passes through the other 3-dB directional coupler, the phase difference between the two modes adds another 90°, thus resulting in the opposite state to that of (1): in the waveguide I, the two modes are in opposite phase, and hence, they are canceled; whereas in the waveguide II, the two modes are in the same phase, and hence, they are added to each other. Thus, the light signal transfers from the waveguide I to the waveguide II in its entirety.

As explained above, when the optical path length $\Delta L = 0$, the phase difference between the even mode and the odd mode is produced only in the directional coupler sections, and unless the phase difference is exactly $\pi$, the complete power transfer does not take place so that a part of the light signal leaks to the through path.

FIGS. 5A–5C illustrate the mode behavior at various stages of the switch element of the present invention where the optical path length difference $\Delta L$ between two directional couplers is $\pi/2$. The behavior of the light signal at positions (1)–(4) in FIGS. 5A–5C are as follows:

(1) and (2) are identical to those of FIGS. 4B and 4C where the optical path length difference $\Delta L = 0$.

(3) Since the phase delay of $\pi$ occurs only in the waveguide II, the electric field in the waveguide II rotates by 180°. The resultant electric field vector can be considered as the composition of the even mode and the odd mode as shown in FIG. 5B.

(4) The phase difference between the two modes is increased by another 90° by passing through the second 3 dB directional coupler, and the entire light signal returns to the waveguide I as shown in FIG. 5C.

These phenomena occur without fail as long as the coupling ratios of the two directional couplers are equal, regardless of the value of the coupling ratios. The reason for this is as follows: when the light signal enters the second directional coupler, the phase of the odd mode in the waveguide I leads, as shown in FIG. 5B, by $\theta$ degrees corresponding to the coupling ratio of the first directional coupler, with regard to the phase of the even mode because of the optical path length difference of $\pi$; the phase lead of the odd mode, however, is canceled by the second directional coupler which delays the odd mode by the same $\theta$ degrees as shown in FIG. 5C; and thus, the relation of the two modes is returned to the first state as shown in FIGS. 4B.

Figure 6:
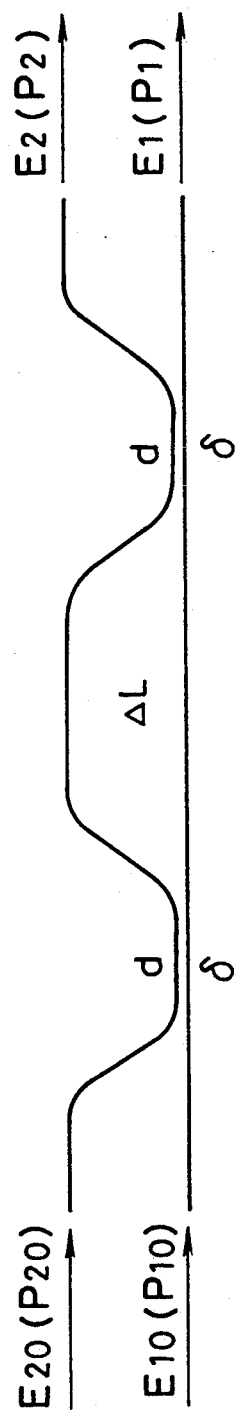
FIG. 6 is a schematic diagram showing parameters of the Mach-Zehnder interferometer type optical switch element according to the present invention.

Let us express the above-mentioned operation by equations. Parameters of the Mach-Zehnder interferometer are defined as shown in FIG. 6: $\delta$ denotes a coupling coefficient of each directional coupler; d, a coupling length; k ($= 2\pi n_{eff}/\lambda_0$), a wave number. The characteristic matrix of a single directional coupler is expressed by $$M_c = \begin{bmatrix} \cos(\delta d) & i\sin(\delta d) \\ i\sin(\delta d) & \cos(\delta d) \end{bmatrix} \tag{3}$$

Here, $\delta d$, when expressed in terms of the above-mentioned modes, denotes the difference between the phases of the even and odd modes. Accordingly, in a 3 dB directional coupler, $$\delta d = \pi/4$$

The phase difference produced by the waveguide arms of the interferometer is expressed by $$M_{MZ} = \begin{bmatrix} \exp(ik\Delta L/2) & 0 \\ 0 & \exp(-ik\Delta L/2) \end{bmatrix} \tag{4}$$

Therefore, the matrix of the electric field of the entire interferometer can be expressed as follows:

$$\begin{bmatrix} E_1 \\ E_2 \end{bmatrix} = M_c \cdot M_{MZ} \cdot M_c \begin{bmatrix} E_{10} \\ E_{20} \end{bmatrix} \tag{5}$$

Expanding equation (5), and expressing it in terms of power, the output characteristics can be expressed as follows:

$$P_1 = P_{10}[\cos^2(2\delta d) \cos^2(k\Delta L/2) + \sin^2(k\Delta L/2)] + P_{20}[\sin^2(2\delta d) \cos^2(k\Delta L/2)] \tag{6}$$

$$P_2 = P_{10}[\sin^2(2\delta d) \cos^2(k\Delta L/2)] + P_{20}[\cos^2(2\delta d) \cos^2(k\Delta L/2) + \sin^2(k\Delta L/2)] \tag{7}$$

When only $P_{10}$ is inputted to the conventional interferometer where the optical path length difference $\Delta L = 0$, the output powers are expressed by $$P_1 = P_{10}\cos^2(2\delta d) \tag{8}$$

$$P_2 = P_{10}\sin^2(2\delta d) \tag{9}$$

In contrast, when only $P_{10}$ is inputted to the interferometer of the present invention, where the optical path length difference $\Delta L=\lambda/2$ ($k\Delta L/2=\pi/2$), the output powers are expressed by $$P_1=P_{10} \tag{10}$$

$$P_2=0 \tag{11}$$

As clearly seen from equation (8), when the optical path length difference $\Delta L=0$ as in the conventional directional couplers, the inputted power $P_{10}$ leaks to the output power $P_1$ unless $\delta d=\pi/4$, that is, unless the directional couplers are a precise 3 dB coupler.

On the other hand, when the optical path length difference $\Delta L=\lambda/2$ as in the present invention, no power leak occurs on principle to the output power $P_2$, regardless of the coupling ratio of directional couplers as expressed by equation (11). This result agrees with the above-described superimposition of the two modes.

From these results, it is found that even if the coupling ratios of the directional couplers deviate from the ideal value of 50%, the crosstalk of the optical matrix switch can be sharply reduced as long as the coupling ratios of the two directional couplers are made equal, regardless of the value of the coupling ratios, when the optical path length difference $\Delta L$ is set at $\lambda/2$ in the OFF state. In an optical matrix switch, however, the number of the switch elements to be driven becomes minimum when the input light signal is outputted from the cross port as stated before. To achieve this, the output ports must be exchanged. In the present invention, this is carried out by intersecting the two waveguides 31a-31b and 32a-32b at the cross portion 35 with such an angle that no interference will occur between the two waveguides.

In contrast with this, when the effective optical path length difference $\Delta L$ of the interferometer is adjusted to zero by increasing the refractive index of the waveguide 31a-31b under the thin film heater 34a by supplying power to the heater, the coupling ratios of the two directional couplers 33a and 33b act in such a fashion that they are added to each other as shown in FIGS. 4A-4D. Accordingly, if the coupling ratio of each directional coupler is set at the ideal value of 50%, the interferometer takes an equivalent coupling ratio of 100% so that the light signal passes through the interferometer with exchanging the waveguides as shown in FIG. 4D. Following this, the light signal is transmitted through the cross portion 35, and thus, is switched to the bar path. Hence, the optical switch element satisfies a condition required for the ON state. When the coupling ratio of the directional couplers 33a and 33b deviates from the ideal value of 50%, not the entire light signal transfers to the bar path, but a part of the light signal remaining in the cross state appears. The remaining light signal, however, is eventually outputted from an unused output side waveguide other than those associated with the output ports 2a, 2b, 2c and 2d of FIG. 2A. Consequently, the extinction ratio of the optical matrix switch suffers no deterioration although the loss is increased.

Figure 7:
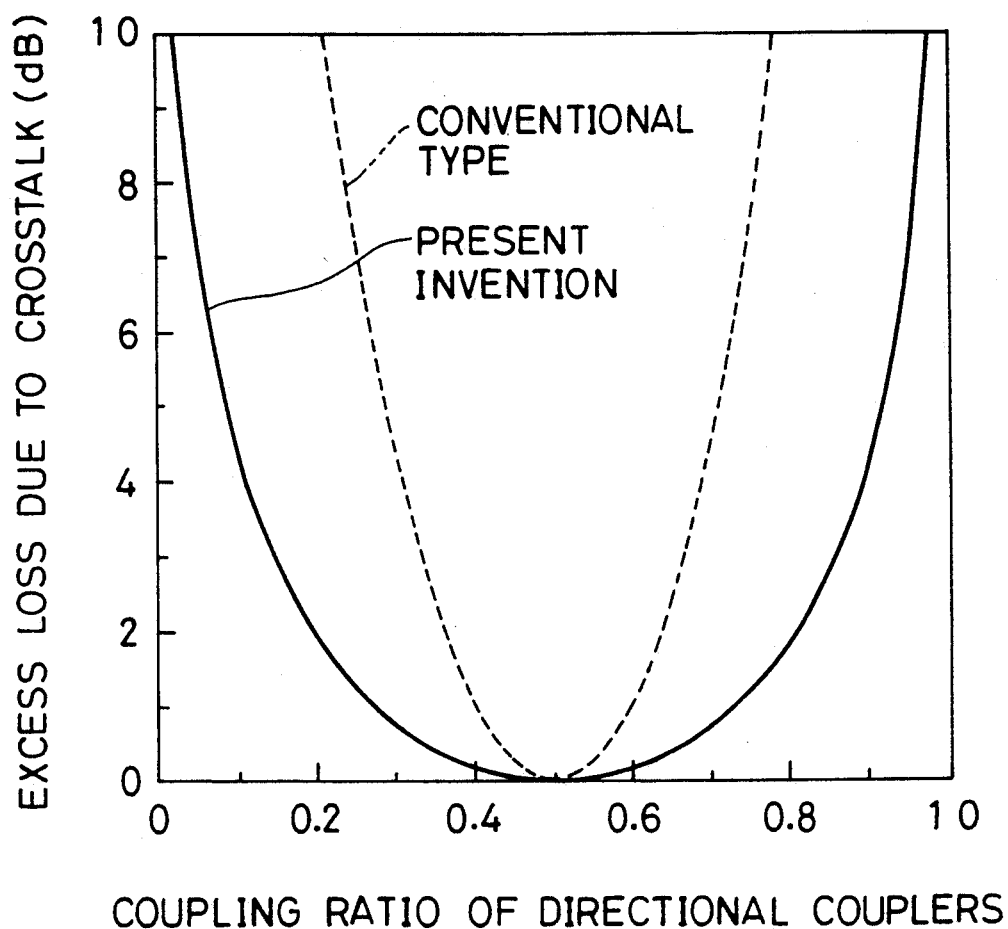
FIG. 7 is a graph illustrating the dependence of the excess loss due to crosstalk on the coupling ratio of directional couplers of the 4×4 optical matrix switch of the first embodiment, and that of the conventional directional couplers.

FIG. 7 is a graph illustrating characteristics of the excess loss caused by the crosstalk in the 4×4 optical matrix switch: values of the excess loss were obtained when the light signal passed through seven switch elements. In FIG. 7, a solid curve indicates the characteristics of the optical matrix switch of the present invention, whereas a broken curve represents that of the conventional optical matrix switch. When the coupling ratio of the directional couplers deviates upward or downward by 5% from the ideal coupling ratio of 50%, the excess loss of the conventional optical matrix switch is 0.25 dB, while that of the optical matrix switch of the present invention is only 0.05 dB. Furthermore, when the coupling ratio of the directional couplers deviates by 15% from the ideal coupling ratio, such as 35% or 65%, the excess loss of the conventional optical matrix switch increases to no less than 2.5 dB, while that of the optical matrix switch of the present invention increases by a very small amount of 0.4 dB.

It must be noted here that although the loss increases sharply as the scale of the optical matrix switch augments in the conventional optical matrix switch, the loss is maintained at a fixed value as shown by the solid curve of FIG. 7, in the optical matrix switch of the present invention, regardless of the scale of the matrix switch, when the coupling ratio of the switch elements is fixed. The reason for this is as follows: In an optical matrix switch, each input light signal passes through one or more switch elements. In this case, only one of the switch elements is made ON state, and the other switch elements are kept OFF state. In the conventional optical matrix switch, the light signal leaks even when it passes through the OFF state switch elements when the coupling ratio of the directional couplers deviates from 50%. Therefore, the excess loss increases as the scale of the matrix augments, and hence, the number of the OFF state switch elements through which the light signal passes increases. In the optical matrix switch of the present invention, however, the light signal does not leak from the OFF state switch elements, but leaks from only one ON state switch element. Thus, the excess loss is caused by the loss of that ON state switch element. As a result, the excess loss takes the same value regardless of the scale of the matrix.

Next, the dependence of the crosstalk on the wavelength will be explained.

FIGS. 8A and 8B show the optical path length difference $\Delta L$ in the ON state and OFF state of the switch element of the present invention, and that of the conventional switch element, respectively. It is found that the optical path length differences of the two are reversely related.

Figure 9A:
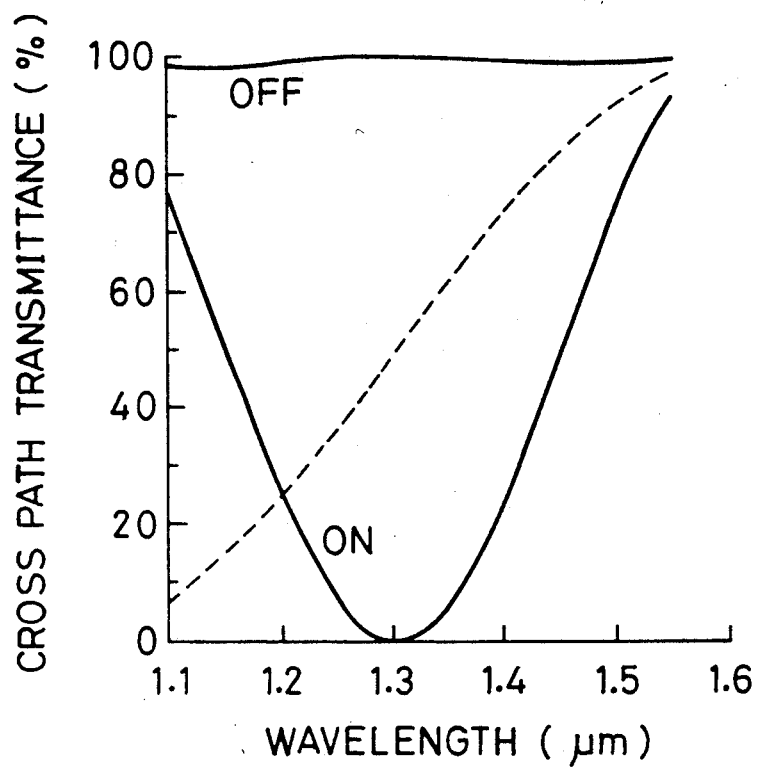
FIG. 9A is a graph illustrating the dependence of the cross path transmittance on the light signal wavelength of the optical switch element of the first embodiment of the present invention.
Figure 9B:
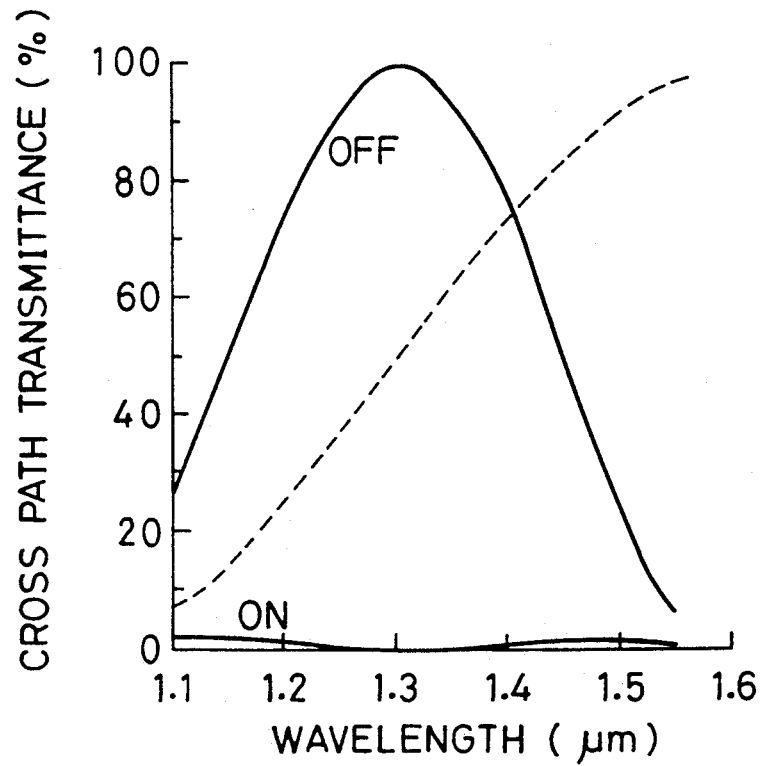
FIG. 9B is a graph illustrating the dependence of the cross path transmittance on the light signal wavelength of the conventional optical switch element.

FIGS. 9A and 9B are graphs illustrating the dependence of the transmittance of the cross path of the optical switch elements on the wavelength of the light signal: FIG. 9A is a graph about the optical switch element of the present embodiment; and FIG. 9B is a graph concerning the conventional switch element shown in FIG. 2B. In FIGS. 9A and 9B, respective two solid curves indicate the dependence of the cross path transmittance on the wavelength in the OFF state and ON state, and each broken curve indicates a coupling ratio of the directional couplers constituting the interferometer. It is assumed that the coupling ratio of the directional couplers are set at the ideal coupling ratio of 50% at the 1.3 μm wavelength. It is noticed here that in FIG. 9A associated with the present invention, the wavelength dependence in the OFF state is small, whereas that in the ON state is large, and conversely, in FIG. 9B associated with the conventional switch element, the wavelength dependence in the OFF state is large, whereas that in the ON state is small. In the practical 4×4 optical matrix switch, the light signal passes through up to seven optical switch elements, and only one of them is in the ON state and the others are in the OFF state. Accordingly, it is clearly understood that the optical switch element of the present invention having smaller wavelength dependence in the OFF state as shown in FIG. 9A is superior to the conventional switch element in reducing the wavelength dependence of the entire optical matrix switch.

Next, the dependence of the cross path transmittance on the wavelength of the light signal is described by using mathematical equations.

First, the wavelength dependence of the conventional switch element in the cross path is explained. In the conventional switch element, the optical path length difference $\Delta L = 0$ in the OFF state. Accordingly, the output characteristic is expressed as follows from equation (9):

$$P_2 = P_{10} \sin^2(2\delta d) \quad (12)$$

Thus, the conventional switch element has wavelength characteristics as shown in FIG. 9B corresponding to the wavelength dependence of the coupling ratio of the directional couplers.

On the other hand, in the ON state of the conventional type switch element, the wavelength dependence is caused not only by the wavelength dependence of the directional couplers but also by the optical path length difference between the waveguide arms linking the two directional couplers. Thus, the output characteristic is expressed as follows from equation (7):

$$P_2 = P_{10}[\sin^2(2\delta d)\cos^2(k\Delta L/2)] \quad (13)$$

The dependence of the optical path length difference on the wavelength of the light signal is no more than 8% for the wavelength of 1.2–1.4 μm, and hence, $\cos^2(k\Delta L/2)$ becomes approximately zero. Consequently, the output to the cross path in the ON state in the conventional switch element is nearly zero, and is little affected by the wavelength dependence of the directional couplers.

Next, the cross path output of the switch element of the present invention is considered. As shown in FIGS. 8A and 8B, the relationship between the ON/OFF state and the optical path length difference is opposite between the switch element of the present invention and the conventional type switch element. In addition, the relationship between the output ports are opposite in the two switch elements. Consequently, the output characteristics of the switch element of the present invention can be obtained by reversing the curves of FIG. 9B with regard to the 50% transmittance line, together with the ON and OFF indications of FIG. 9B. Thus, FIG. 9A is obtained as a graph representing the output characteristics of the switch element of the present invention.

As clearly seen from these figures, although the conventional type switch element exhibits considerable wavelength dependence in the OFF state, the switch element of the present invention exhibits little wavelength dependence in the OFF state.

Figure 10:
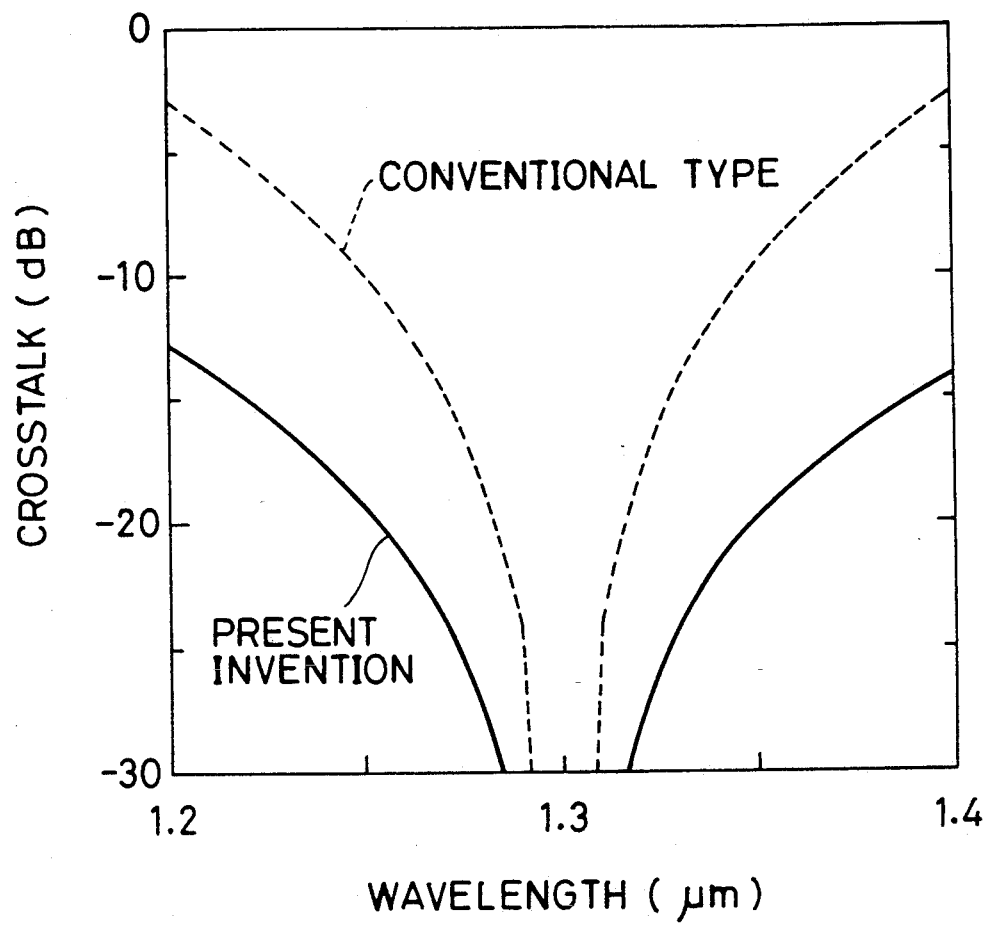
FIG. 10 is a graph comparatively illustrating the dependence of the crosstalk on the light signal wavelength of the first embodiment of the 4×4 optical matrix switch according to the present invention, and that of the conventional 4×4 optical matrix switch.

FIG. 10 illustrates calculation results about the crosstalk when the light signal passes through seven switch elements in the 4×4 matrix switch. Here, the crosstalk is defined as the total sum of the leaked light from the remaining three input?? ports when the main light signal is incident onto one input port. The calculations were performed on the basis of the wavelength dependence described above. The crosstalk of the switch element of the present invention, which is shown by solid curves in FIG. 10, exhibits smaller wavelength dependence than that of the conventional type switch element, which is shown by broken curves. For example, although the wavelength range in which crosstalk is less than $-15$ dB is 50 nm in the conventional optical matrix switch, it expands to 170 nm in the present embodiment. The smaller wavelength dependence of the optical matrix switch of the present invention is closely related to the fact that the optical matrix switch of the present invention is little affected by fabrication errors.

More practical fabrication procedures of the present embodiment will be described below. The 4×4 optical matrix switch of this embodiment was formed on a 1 mm thick, 3 inch diameter silicon substrate 11.

Figure 2A:
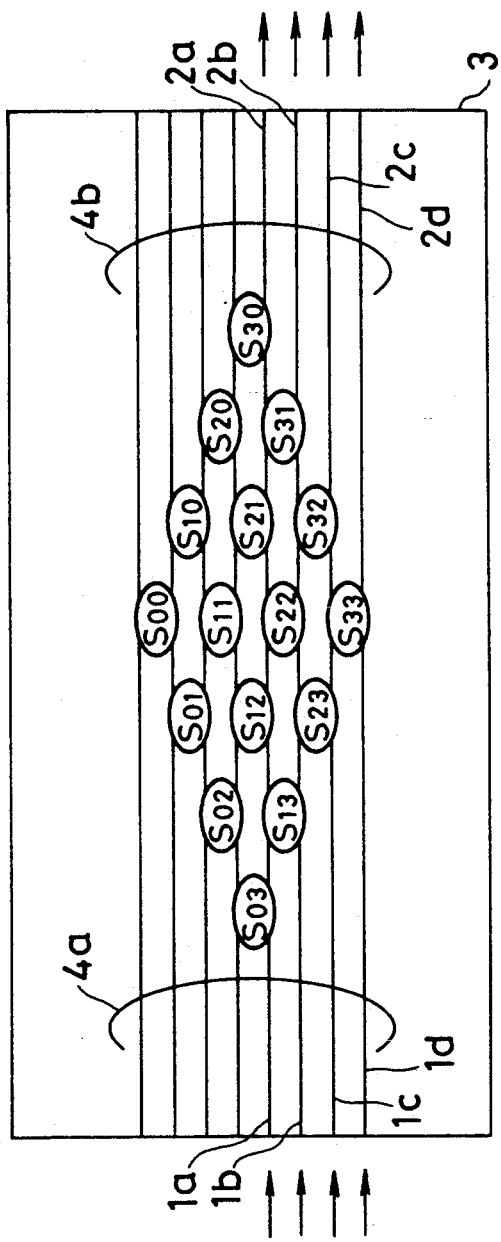
FIG. 2A is a plan view showing an entire arrangement of a 4×4 waveguide-type optical matrix switch.
Figure 2B:
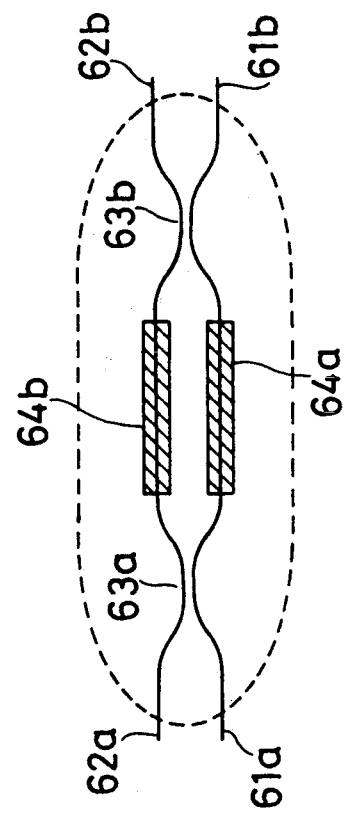
FIG. 2B is an enlarged plan view showing an arrangement of a conventional optical switch element of FIG. 2A.

FIGS. 11A–11F are cross-sectional views illustrating the process for simultaneously fabricating 16 optical switch elements arranged as shown in FIG. 2A. Each switch element includes silica-based single-mode optical waveguides having cross-sectional structure as shown in FIGS. 3B and 3C.

Figure 11A:
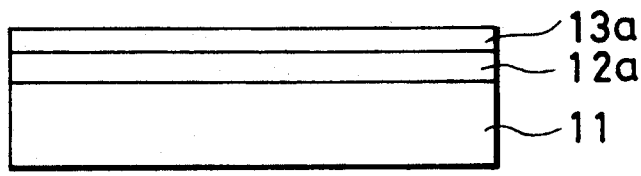
FIGS. 11A-11F are cross-sectional views for explaining a fabrication process of the optical matrix switch comprising the silica-based-glass waveguides according to the present invention.
Figure 11B:
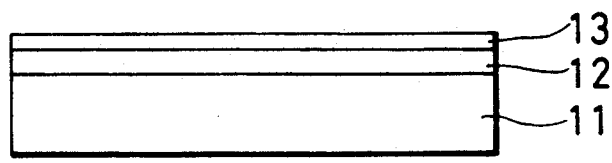
Figure 11C:
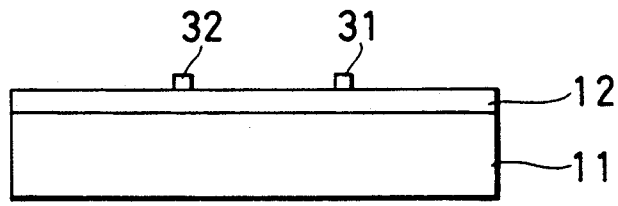
Figure 11D:
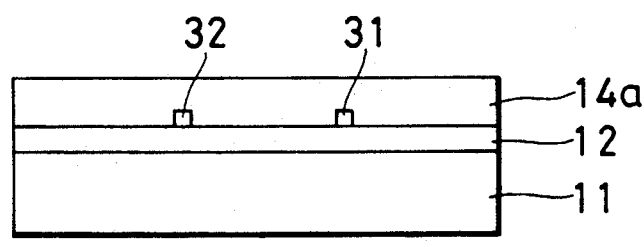
Figure 11E:
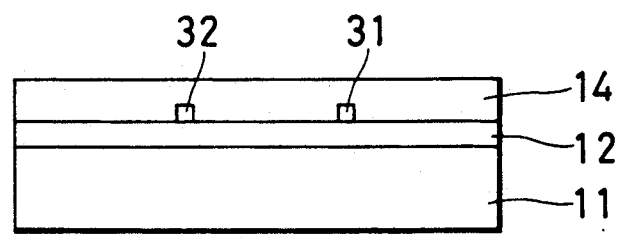
Figure 11F:
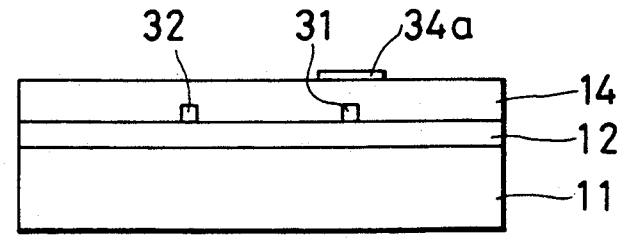

First, fine glass particle layer 12a for a bottom cladding layer 12, whose base component was pure silica ($SiO_2$), was deposited on the silicon substrate 11 by the frame-hydrolysis deposition. The frame-hydrolysis deposition used, as a raw material, mixture gas composed of silicon chloride ($SiCl_4$) as a base component, together with small amounts of boron chloride ($BCl_3$) and phosphorus chloride ($PCl_3$). Subsequently, by switching the mixture gas to that composed of the above-mentioned components plus an appropriate amount of germanium chloride ($GeCl_4$), fine glass particle layer 13a for a core layer 13, whose base component was $SiO_2$-$GeCl_4$, was deposited as shown in FIG. 11A. Then, the silicon substrate 11 on which the two fine glass particle layers 12a and 13a had been deposited was heated at approximately 1350° C. in an electric furnace to consolidate the fine glass particles, thus forming the bottom cladding layer 12 and the core layer 13 as shown in FIG. 11B. After that, unnecessary portions of the core layer 13 were removed by the photolithography process and the reactive ion etching process to form cores 31 and 32 as shown in FIG. 11C. Subsequently, fine glass particle layer 14a for a top cladding 14 was deposited by utilizing the frame-hydrolysis deposition using an $SiCl_4$-$BCl_3$-$PCl_3$ mixture gas as a raw material so that the cores 31 and 32 were embedded in the layer 14a as shown in FIG. 11D. Then, the silicon substrate 11 was heated again in the electric furnace so as to consolidate the fine glass particle layer 14a for the top cladding 14, thus forming single-mode optical waveguides as shown in FIG. 11E. Finally, as shown in FIG. 11F, a thin film heater 34a as an optical phase shifter was deposited on a predetermined position on the top cladding 14 over the optical waveguide 31 of each optical switch element formed on the silicon substrate 11 through the above-mentioned procedures.

The cross section of the cores 31 and 32 of the optical waveguides was 6 μm×6 μm, and the relative refractive index difference $\Delta$ between the cores and the cladding layers 12 and 14 was 0.75%. The 4×4 optical matrix switch of the present embodiment has a basic structure in which eight silica-based-glass optical waveguides are parallely disposed at a 250 μm pitch. Each optical switch element employs as its integral parts a linear optical waveguides and curved waveguides whose radius of curvature is approximately 4 mm.

Figure 12:
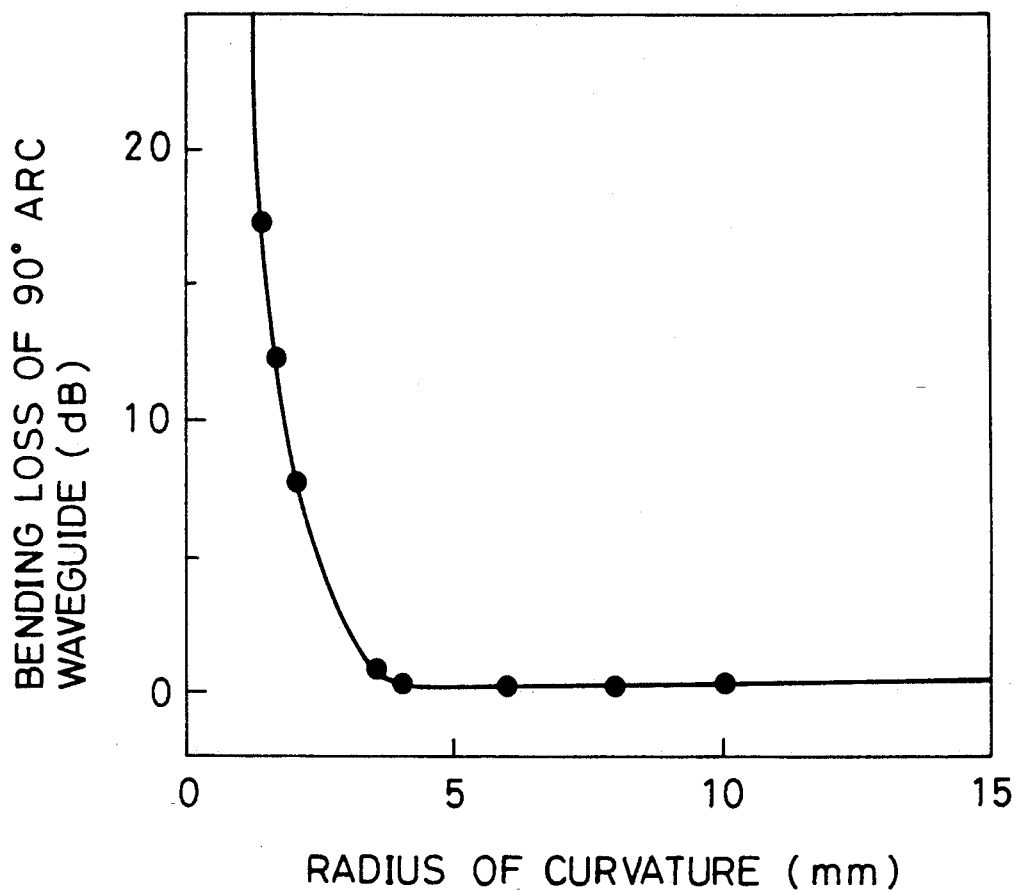
FIG. 12 is a graph illustrating the dependence of the bending loss on the radius of curvature of a 90° arc silica-based single-mode optical waveguide used in the present invention.

FIG. 12 is a graph plotting experimental values about the dependence of the bending loss on the radius of curvature of a 90 degree arc silica-based single-mode optical waveguide, which will serve as guidelines for appropriately setting the radius of curvature of the curved waveguides. In the optical waveguides whose relative refractive index difference Δ between the cladding layers 12 and 14 is 0.75%, which were employed in this embodiment, the minimum allowable radius of curvature was approximately 4 mm, and this value was used so that the whole optical matrix switch could be accommodated on the substrate with a limited area.

In addition, the cross angle at the cross portion 35 was set at 30 degrees. The effective optical path length difference between the two directional couplers was exactly set at 0.65 μm, or half the light signal wavelength of 1.3 μm, by using the photolithography process. Considering that the refractive index of the silica-based glass was approximately 1.45, the waveguide length difference on a real mask pattern was set at 0.45 μm (=0.65 μm/1.45). The thin film heater 34a was formed by depositing a 0.3 μm thick, 50 μm wide, 4 mm long chromium thin film on each optical switch element by the vacuum evaporation method using chromyl as an evaporation source. The total length of each optical switch element including the two directional couplers 33a and 33b, the thin film heater 34a and the cross portion 35 was about 15 mm.

The optical matrix switch formed on a silicon wafer through the above-described procedures was cut into 10 mm × 110 mm rectangular chip by using a dicing-saw. A heat-sinker was disposed on the bottom of the silicon substrate 11, optical fiber arrays were joined to the input and output optical waveguides, and leads for power supply were connected to the thin film heater 34a. Thus, the optical matrix switch was completed. By supplying power currents to selected thin film heaters, switching operation of the 4×4 matrix switch was confirmed. The power consumption of each thin film heater 34a required for the switching operation was about 0.5 W, and hence, the total consumption power was a maximum of 2 W because up to four thin film heaters operated at the same time. The total loss of the optical matrix switch was 3-4 dB including the loss at the optical fiber joints, and the extinction ratio thereof was greater than 25 dB even when the coupling ratios of the directional couplers largely deviated from the ideal value of 50% by ±10% owing to fabrication errors.

EMBODIMENT 2

Figure 13:
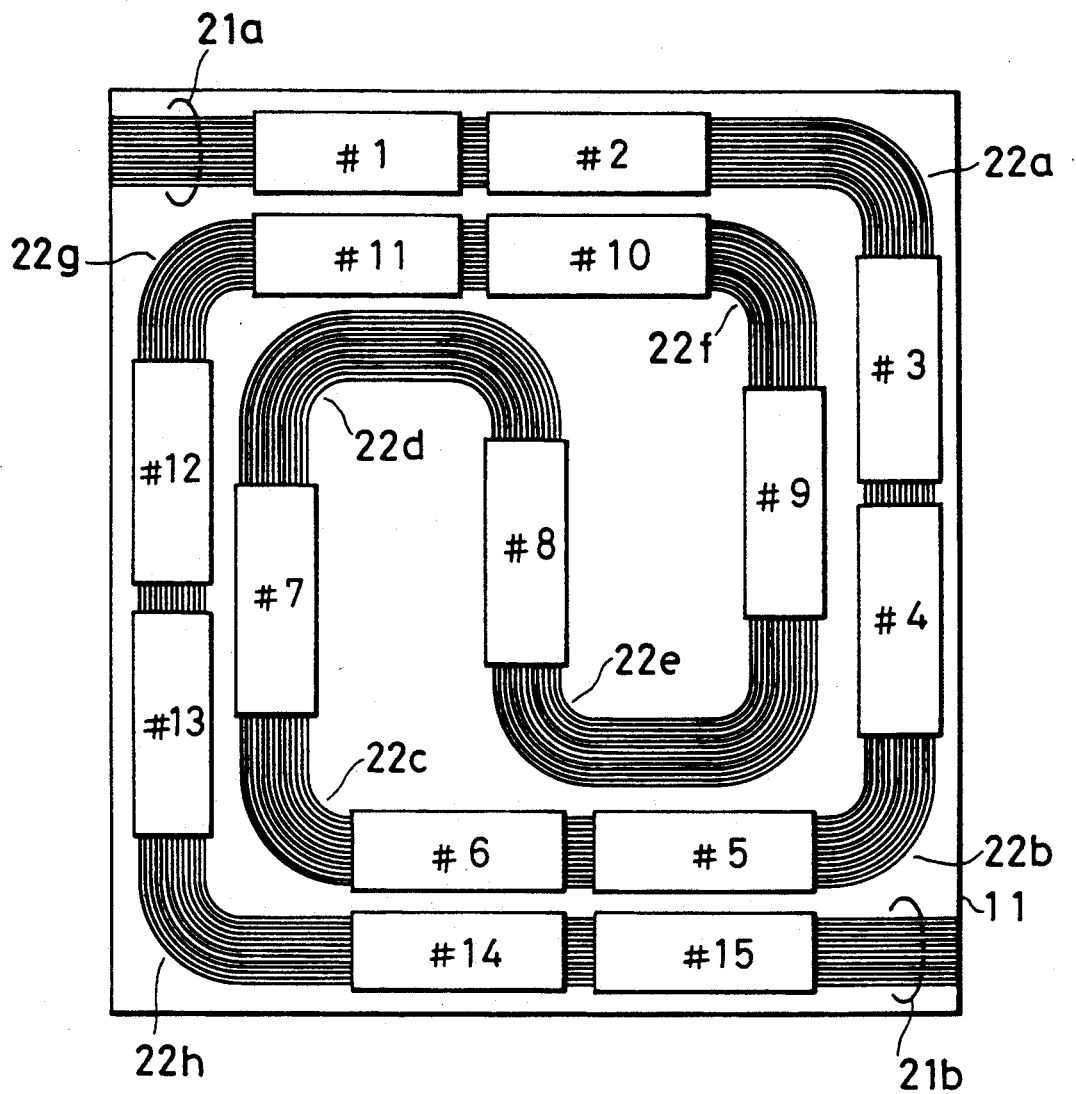
FIG. 13 is a plan view showing an entire arrangement of an 8×8 optical matrix switch as a second embodiment of a waveguide-type optical matrix switch according to the present invention.

FIG. 13 is a plan view showing an entire arrangement of an 8×8 optical matrix switch as a second embodiment of a waveguide-type optical matrix switch according to the present invention. In this figure, reference numeral 11 denotes a silicon substrate, and a reference numeral 21a-21b designates a waveguide bundle consisting of 16 (=8+8) silica-based optical waveguides. Midway between the input port and output port of the waveguide bundle 21a-21b, 15 optical switch groups #1-#15 are disposed. The switch groups #1-#15 include 1, 2, ..., 7, 8, 7, ... 2, and 1 optical switch elements, respectively. This arrangement is characterized in that waveguide bundles 22a, 22b, 22c, 22d, 22e, 22f, 22g, and 22h, each of which includes 90 or 180 degree curve, are provided to connect between the switch groups #2 and #3, #4 and #5, #6 and #7, #7 and #8, #8 and #9, #9 and #10, #11 and #12, and #13 and #14, respectively. In other words, the 15 optical switch groups are arranged on the limited area substrate in a serpentine layout by using the curved waveguide bundles.

Figure 14:
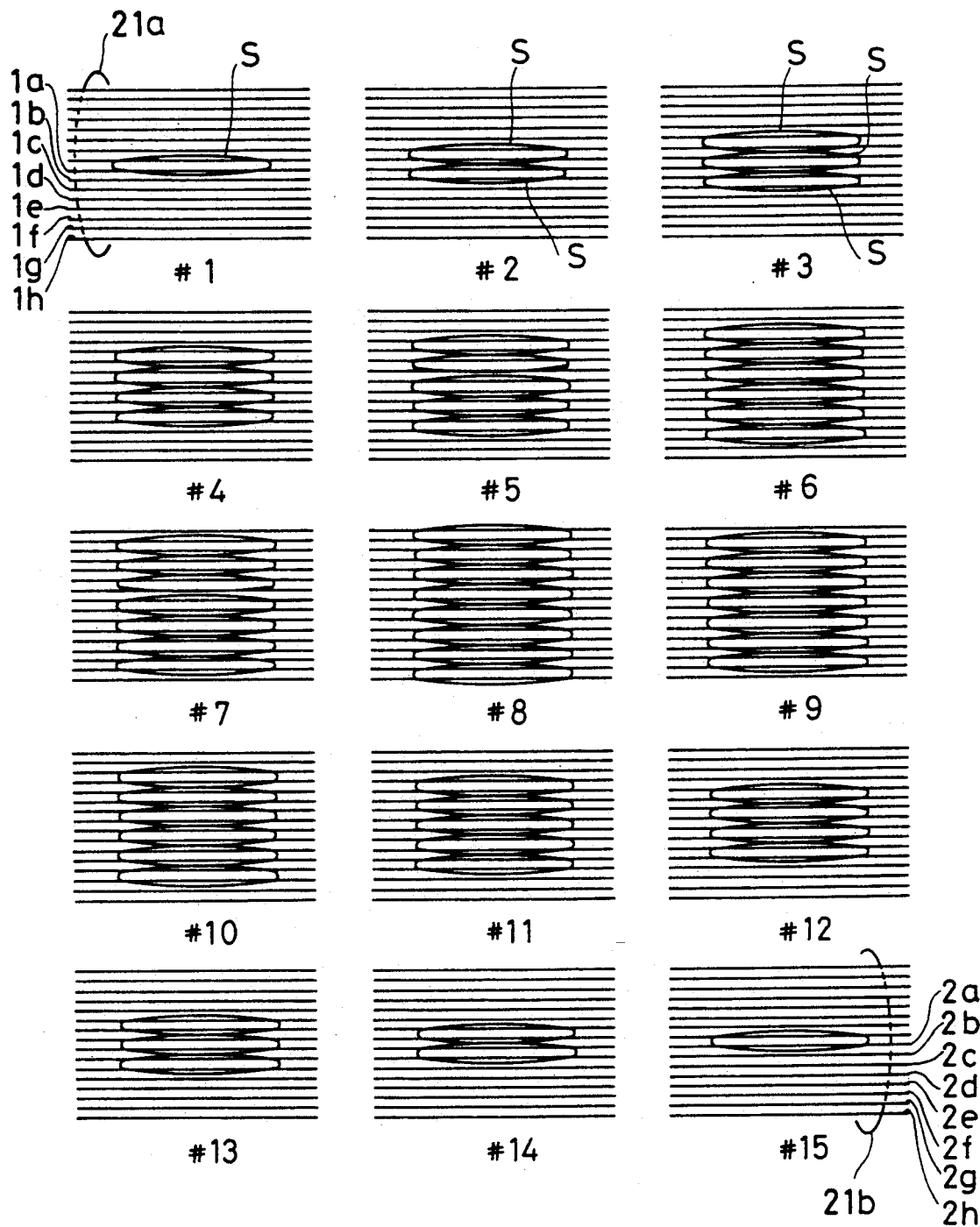
FIG. 14 is a plan view showing arrangements of optical switch groups of the optical matrix switch as shown in FIG. 13.

FIG. 14 is a plan view showing the arrangement of each optical switch group #1-#15 of the optical matrix switch as shown in FIG. 13: it shows the way how optical switch elements are arranged on the way from the input port to the output port of the waveguide bundle 21a-21b. The switch groups include 1, 2, ..., 7, 8, 7, ..., 2, and 1 optical switch elements as denoted by ellipses in FIG. 14. The left end of the optical switch group #1 is joined to the input port of the waveguide bundle 21a-21b including eight input optical waveguides 1a, 1b, 1c, 1d, 1e, 1f, 1g and 1h. The optical switch groups #1 and #2 are directly connected, and the optical switch groups #2 and #3 are joined by the curved waveguide bundle 22a, and the like. Finally, the right end of the optical switch group #15 is led to the output port of the waveguide bundle 21a-21b including eight output optical waveguides 2a, 2b, 2c, 2d, 2e, 2f, 2g and 2h.

Figure 15:
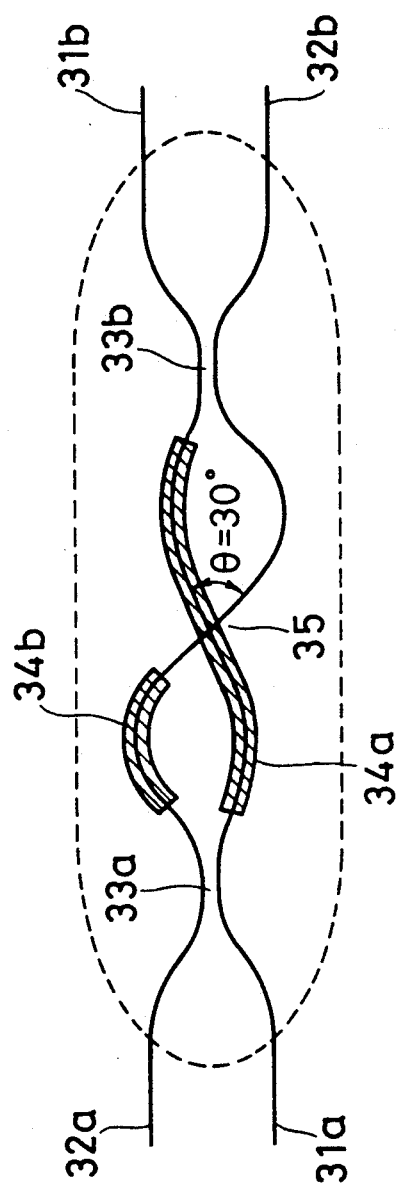
FIG. 15 is a plan view showing an arrangement of an optical switch element constituting the optical matrix switch as shown in FIG. 13.

FIG. 15 is a plan view showing an arrangement of an optical switch element constituting the optical matrix switch as shown in FIGS. 13 and 14. Two silica-based optical waveguides 31a-31b and 32a-32b are placed in close proximity separated approximately several micrometers apart at two positions on a silicon substrate, thereby forming two directional couplers 33a and 33b. A cross portion 35 is provided between the two directional couplers 33a and 33b. The coupling ratios of the directional couplers are set to become 50% by adjusting the separation of the waveguides at the coupling section and the coupling length. The effective optical path length of the optical waveguides 31a-31b and 32a-32b between the two directional couplers 33a and 33b are set such that the waveguide 32a-32b is longer than the waveguide 31a-31b by half the light signal wavelength of 1.3 μm, that is, by 0.65 μm. In addition, thin film heaters 34a and 34b are disposed on top of a cladding layer in such a manner that the heaters 34a and 34b are placed just over the waveguides 31a-31b and 32a-32b, respectively. The waveguides 31a-31b and 32a-32b intersect with a cross angle of θ (30 degrees, for example) at the cross portion 35. The optical switch element shown in FIG. 15 is 12 mm long. In the optical switch element of this embodiment, since the cross portion 35 is provided between the directional couplers 33a and 33b, two locations (between the two directional couplers and at the cross portion 35) at which the two waveguides are rather separated from each other in FIG. 3A can be unified. As a result, the length of the optical switch element can be reduced to about 12 mm, which is shorter than that of the first embodiment, where it is 15 mm long.

The 8×8 optical matrix switch formed on a silicon wafer was cut into 55 mm×55 mm square chip by using a dicing-saw. A heat-sinker was disposed on the bottom of the silicon substrate, optical fiber arrays were joined to the input and output optical waveguides, and leads for power supply were connected to the thin film heaters 34a and 34b. Thus, the optical matrix switch was completed. By supplying currents to selected thin film heaters, switching operation of the 8×8 matrix switch was confirmed. The power consumption of each thin film heater required for the switching operation was about 0.5 W, and hence, the total consumption power was a maximum of about 4 W because up to eight thin film heaters operated at the same time. The total loss of the optical matrix switch was 5-7 dB including the loss at the optical fiber joints, and the extinction ratio thereof was greater 20-25 dB even when the coupling ratios of the directional couplers largely deviated from the ideal value of 50% by ±10% owing to fabrication errors.

In the present embodiment, the optical switch element includes two thin film heaters 34a and 34b as shown in FIG. 15. Although the thin film heater 34a disposed over the shorter waveguide 31a–31b is sufficient in a normal operation, the thin film heater 34b serves to compensate an optical path length difference error by lightly supplying power to the thin film heater 34b even if the error has been caused by an accident during the fabrication.

In the arrangement of the optical matrix switch of the second embodiment, the number of optical switch elements through which the light signal passes is different. For example, when the light signal incident onto the input optical waveguide 1h is produced from the output optical waveguide 2h, it passes through only one optical switch element, whereas when the light signal incident onto the input optical waveguide 1a is produced from the output optical waveguide 2a, it passes no less than 15 optical switch elements. Consequently, when each optical switch element produces a constant transmission loss, the output level of the light signal fluctuates in accordance with the traveling path of the light signal. This will present a problem in some cases. In such a case, the following embodiment can be employed to eliminate the problem.

EMBODIMENT 3

Figure 16:
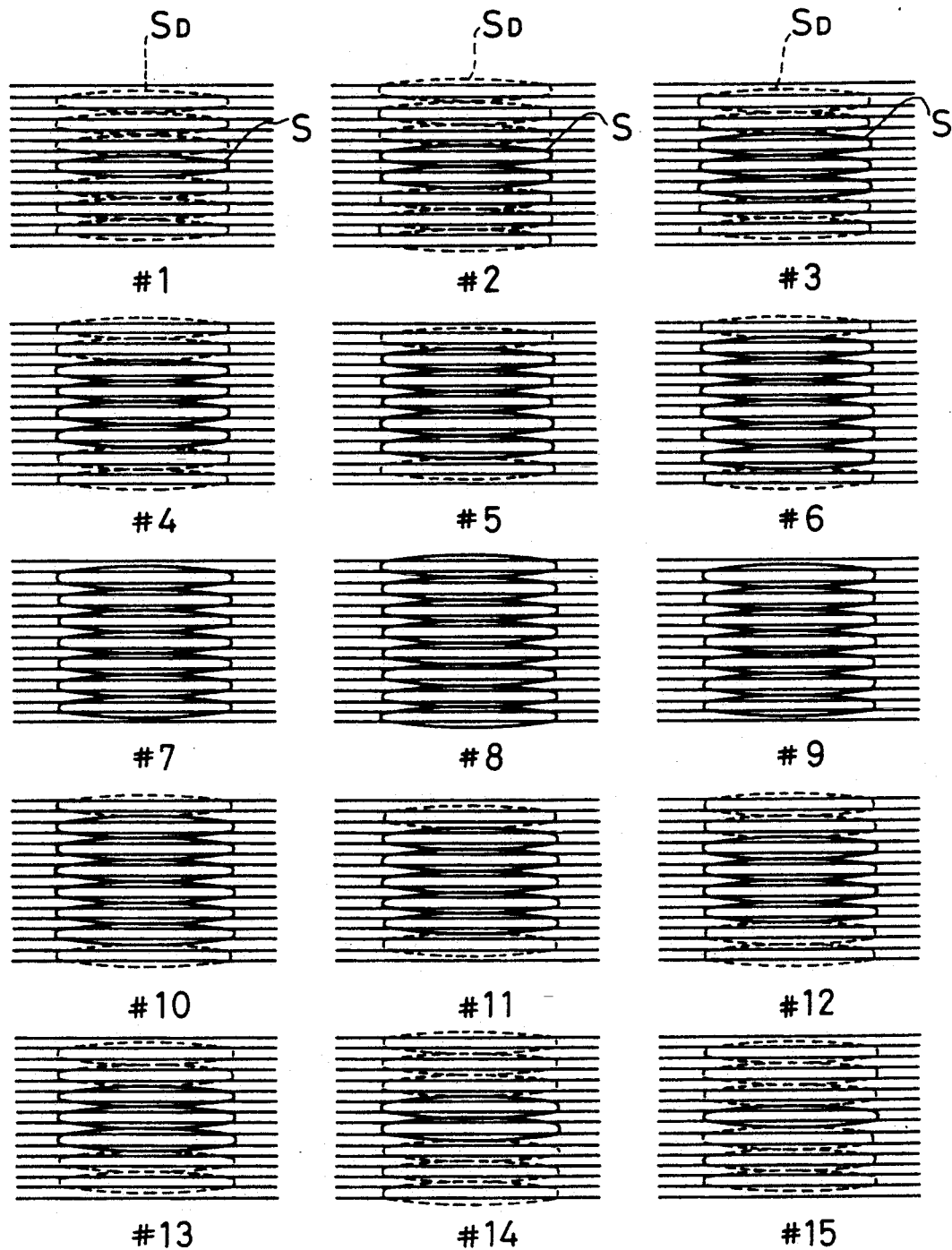
FIG. 16 is a plan view showing arrangements of optical switch groups of a third embodiment of the waveguide-type optical matrix switch according to the present invention.

FIG. 16 shows an arrangement of optical switch groups used in a third embodiment of the present invention. The third embodiment is identical in its basic structure to the second embodiment described with reference to FIGS. 13 and 14, but is different in that inactive optical switch elements $S_D$ are disposed in addition to optical switch elements S in each optical switch group. The inactive switch element $S_D$ has the same geometry as that of the optical switch element of FIG. 15 except that the thin film heaters 34a and 34b are omitted, and the coupling ratios of directional couplers are equal, regardless of the value of the two coupling ratios. By adding such inactive optical switch elements $S_D$, the fluctuations of the output level of the optical matrix switch due to the traveling path difference was reduced. The total loss of the optical matrix switch was 6.5–7 dB, and the extinction ratio equal to or greater than 20 dB was achieved even if the coupling ratios of the directional couplers deviated from the ideal value of 50% by about ±10% owing to fabrication errors.

In the above-described embodiments, the cross angle θ of the two waveguides is set as 30 degrees. The setting of the cross angle θ is considered in terms of the crosstalk and cross loss.

Figure 17:
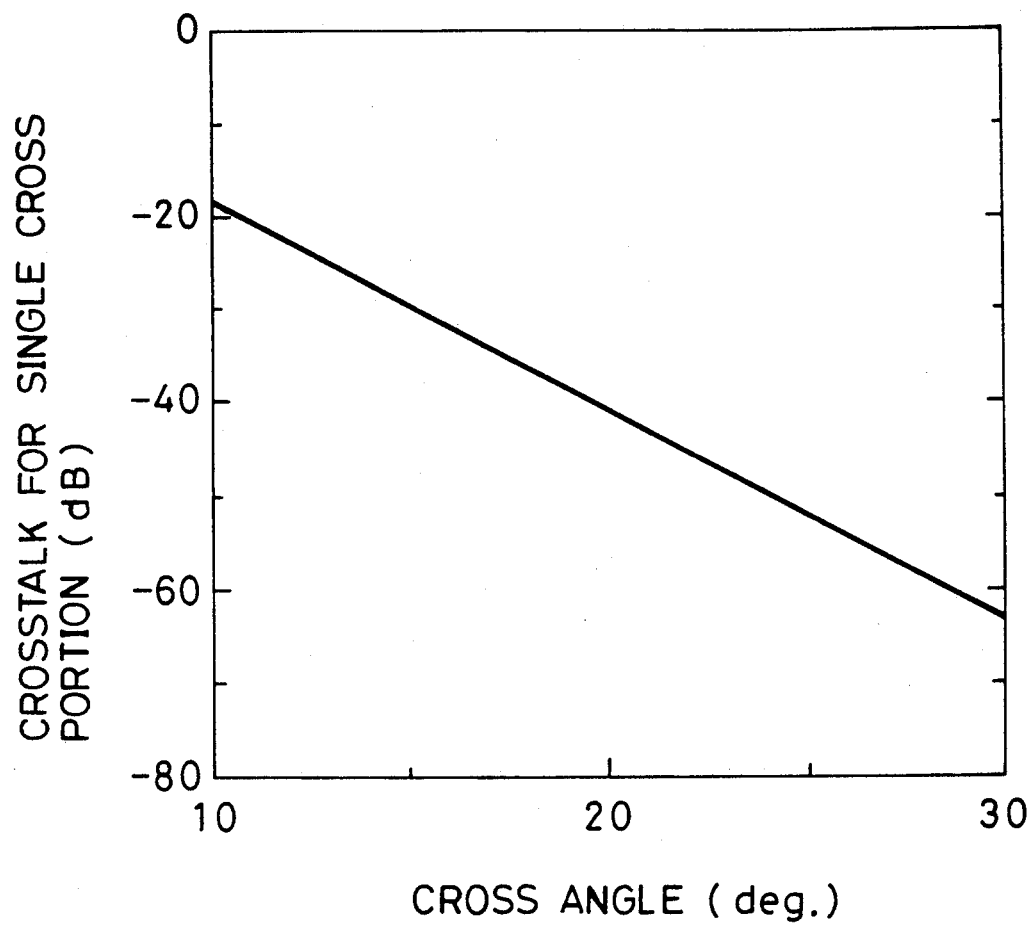
FIG. 17 is a graph illustrating the dependence of the crosstalk on the cross angle at a single cross portion of a Mach-Zehnder interferometer type optical switch element according to the present invention.

FIG. 17 is a graph illustrating the dependence of the crosstalk on the cross angle, that is, an amount of the light signal leaked to a counterpart optical waveguide at a single cross portion. The optical waveguides used here has a relative refractive index difference Δ of 0.75% between the core and cladding, and has the cross section of 6 μm × 6 μm. As the cross angle increases, the crosstalk declines. In the present invention, the two optical waveguides in an optical switch element must intersect at such an angle that the crosstalk can be ignored. An angle such that the crosstalk due to the intersection of the two waveguides falls less than −30 dB is considered appropriate. Although such an angle depends on the relative refractive index difference between the core and cladding of the waveguides, the crosstalk between the two waveguides is practically negligible when the cross angle is greater than approximately 15 degrees owing to the contribution of the direct propagation characteristic of light. At the cross angle of 30 degrees employed in the above-described embodiments, the crosstalk was small as less than −60 dB.

Figure 18:
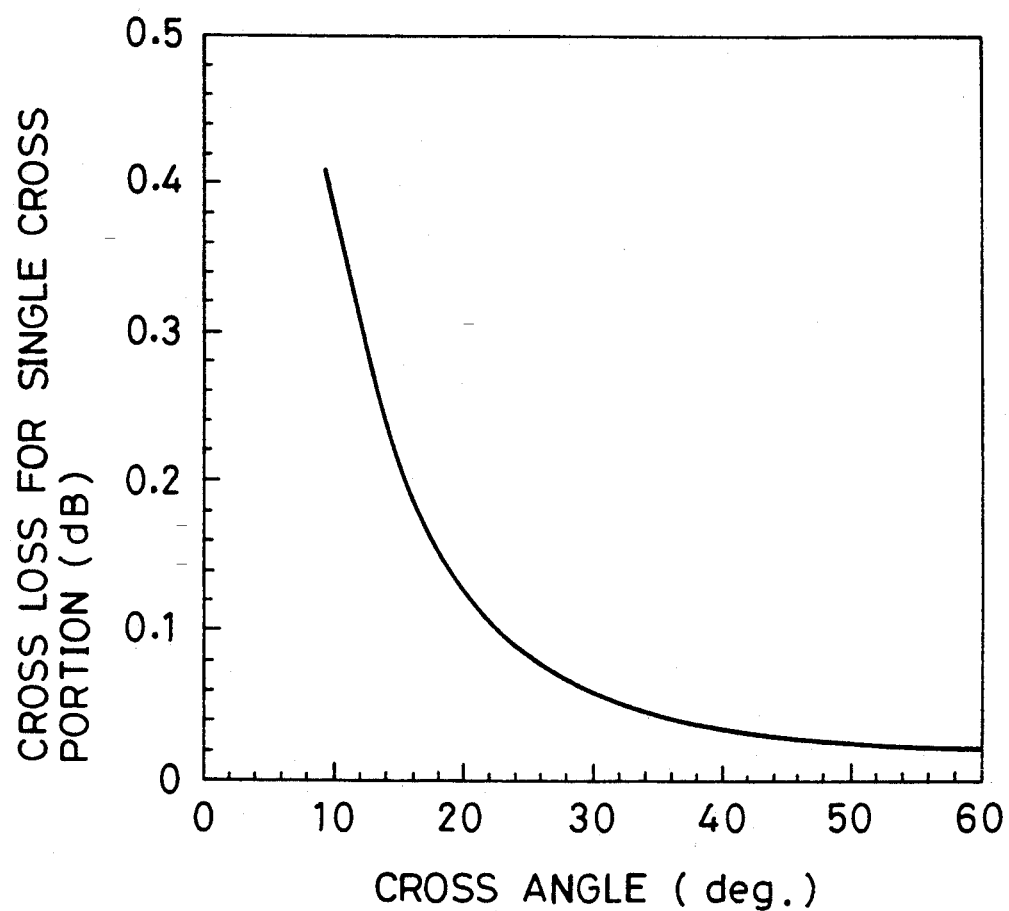
FIG. 18 is a graph illustrating the dependence of the cross loss on the cross angle at a single cross portion of a Mach-Zehnder interferometer type optical switch element according to the present invention.

FIG. 18 is a graph illustrating the dependence of the cross loss on the cross angle. The optical waveguides used here also has a relative refractive index difference Δ of 0.75% between the core and cladding, and has the cross section of 6 μm × 6 μm. As the cross angle increases, the crosstalk decreases: the loss less than 0.2 dB can be achieved when the cross angle is greater than approximately 15 degrees where the crosstalk is negligible. At the 30 degree cross angle employed in the embodiments, the loss for each cross portion is 0.06 dB, which is very small. The total excess loss due to the cross portions in the 8×8 optical matrix switch is less than 1 dB, which is also small.

As seen from the two results described above, the loss and the crosstalk at the cross portion are decreased as the cross angle approaches 90 degrees. Accordingly, it is preferable that the cross angle be greater than 15 degrees, and be as close to 90 degrees as possible. A large cross angle, however, is liable to increase occupation areas of curved sections, resulting in the increase in sizes of the optical switch element. Consequently, the amount of the cross angle is determined taking account of the required performance of an optical matrix switch, allowable radius of curvature of optical waveguides, or the like.

Next, geometry of optical waveguides at a cross portion will be considered.

FIGS. 19A–19E are schematic diagrams for explaining the geometry of the cross portions. In the above embodiments, width of the waveguides was uniform throughout the circuits as shown in FIG. 19A. The geometry of a cross section of the waveguides, however, can be modified to reduce the loss at the cross portion.

One method of the modifications is shown in FIGS. 19B and 19C: waveguides are tapered in sections before and after the cross portion. More specifically, optical waveguides 41a, 41b, 42a and 42b of a common width, which constitute the circuit of a switch element except the cross portion, are joined to tapered optical waveguides 43a, 43b, 44a and 44b for transforming the waveguide width, respectively. The tapered waveguides 43a and 43b, and 44a and 44b are joined in turn to waveguides 45 and 46, which constitute the cross portion, and whose width serves to reduce the cross loss. When the cross portion is made up of the common waveguides whose relative refractive index difference Δ between the core and cladding is 0.75%, and whose width is 6 μm, the cross loss is 0.06 dB as stated before. In contrast, when the waveguides whose width is 4 μm or 10 μm are used to constitute the cross potion, the cross loss is reduced to 0.05 dB. It indicates that the cross loss can be reduced by appropriately setting the width of the waveguides at the cross portion. In this case, the tapered waveguides 43a, 43b, 44a and 44b for transforming the waveguide width must be gradually tapered so that radiation loss or the like do not occur.

Another method of the modifications is shown in FIGS. 19D and 19E: tapered waveguides 47a–47b and 48a–48b are extended to the cross portion so that the width at the cross portion is reduced or increased. When the cross portion is made up of the common waveguides whose relative refractive index difference Δ between the core and cladding is 0.75%, whose width is 6 μm, and which cross at an angle of 30 degrees, the cross loss is 0.06 dB as stated before. In contrast, when the waveguides whose width is gradually narrowed from 6 μm to 5 μm over a tapered length of 50 μm as shown in FIG. 19D, the cross loss is reduced to 0.03 dB. This indicates that the method is effective for reducing the cross loss.

In the above embodiments, all the optical waveguides are smooth. Considering the eigen electric field distribution in an optical waveguide, however, the shape and center of the electric field distribution differ in accordance with the shape of the waveguide: in accordance with a straight or curved waveguide; or with a radius of curvature. For this reason, when the optical waveguides of different geometry are joined with aligning the center thereof, not only the radiation loss due to mismatch of the eigen electric field distributions, but also the light undulation that unstabilizes the characteristics of directional couplers and a Mach-Zehnder interferometer will occur. Accordingly, a method is effective where optical waveguides of different geometry, such as a straight waveguide and a curved waveguide, or curved waveguides of different radii of curvature or of different curved directions, are joined with a small amount of offset: the centers of the waveguides are joined with offsets in such a fashion that no tilt between the center axes of the waveguides will occur so that the eigen electric field distributions of the two joined waveguides are matched as perfect as possible. This method is effective not only to reduce the loss, but also to restrict the light undulation.

Figure 20:
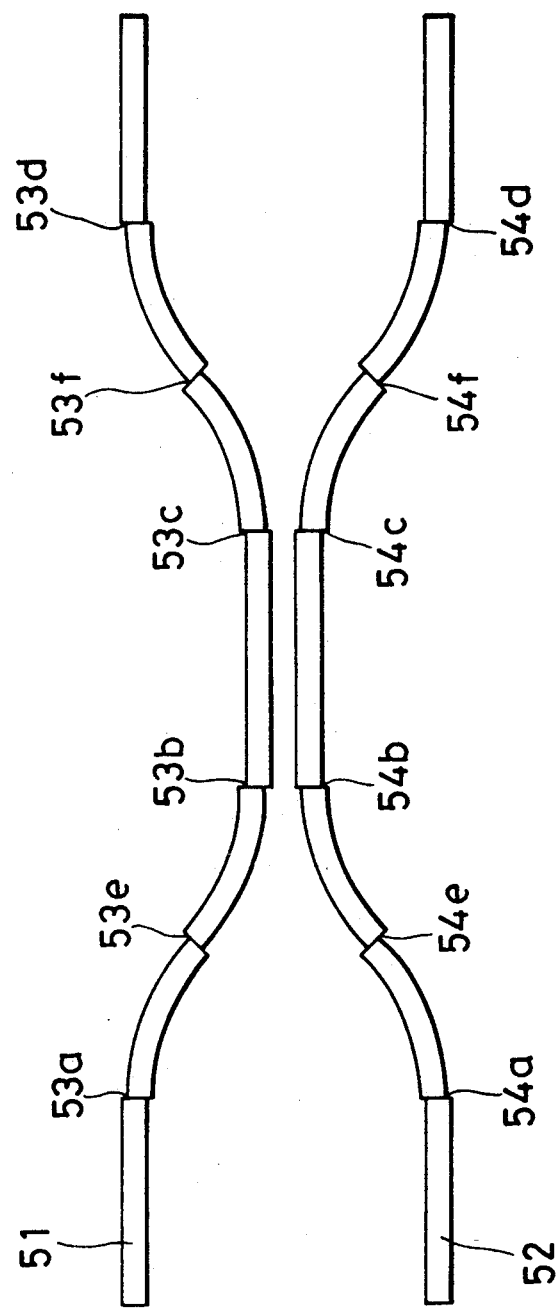
FIG. 20 is a schematic plan view illustrating an arrangement of a directional coupler including offsets of the waveguides of a Mach-Zehnder interferometer type optical switch element according to the present invention.

FIG. 20 is a schematic diagram showing an arrangement of a directional coupler having an offset structure. The offset structure is applied to joints 53a, 53b, 53c, 53d, 54a, 54b, 54c and 54d, where a straight waveguide and a curved waveguide are joined, and to joints 53e, 53f, 54e and 54f, where curved waveguides of different directions are joined. An amount of the offset is generally on a submicron order, although it differs depending on the relative refractive index difference between the core and cladding, the geometry of optical waveguides, and the wavelength of a light signal.

Although in the above-described embodiments, the optical phase shifter (a thin film heater) is disposed over a shorter waveguide by half a wavelength than the other, so that the optical path length difference of ½ wavelength is canceled to change the switch element to the ON state, the ON state can be realized by increasing the optical path length difference to one wavelength. This, however, presents a disadvantage that the wavelength dependence in the ON state increases.

Furthermore, although in the above-described embodiments, a light signal whose wavelength is 1.3 μm is used, the structure of the present invention can be readily applied to other light signals of different wavelengths, such as 1.55 μm.

Although it has been stated that the optical matrix switch of the present invention is little affected by fabrication errors of directional couplers, it must also be emphasized that the present invention has a subsidiary effect that it is little affected by the polarization dependence of directional couplers.

Furthermore, although in the above embodiments, the structure and operation of the optical matrix switch based on the silica-based optical waveguides on a silicon substrate have been explained, the present invention can also be applied to other materials, such as plastic waveguides, ion-diffused glass waveguides, or lithium niobate waveguides with an optical phase shifter using an electrooptic effect, which can constitute a Mach-Zehnder interferometer type optical switch element.

The present invention has been described in detail with respect to various embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A waveguide-type optical switch for switching a light signal inputted thereto, comprising:
   a substrate;
   two directional couplers arranged by placing two optical waveguides in close proximity at two positions on said substrate, and having an identical coupling ratio, said two optical waveguides having an effective optical path length difference of half a wavelength of the light signal between said two directional couplers;
   optical path length switching means disposed over at least one of said two optical waveguides between said two directional couplers for switching said effective optical path length difference to an integral multiple of the wavelength of the light signal; and
   a cross portion at which said two optical waveguides are intersected.

2. A waveguide-type optical switch as claimed in claim 1, wherein said optical path length switching means is an optical phase shifter.

3. A waveguide-type optical switch as claimed in claim 2, wherein said optical phase shifter is a thermooptic effect phase shifter consisting of a thin film heater.

4. A waveguide-type optical switch as claimed in claim 1, wherein said optical path length switching means is two optical phase shifters each of which is disposed over each one of said two optical waveguides between said two directional couplers.

5. A waveguide-type optical switch as claimed in claim 4, wherein one of said optical phase shifters compensates for an offset of said effective optical path length difference when said effective path length difference deviates from half a wavelength of the light signal.

6. A waveguide-type optical switch as claimed in claim 2, wherein said optical phase shifter is disposed over a longer waveguide of said two optical waveguides so that said effective optical path length difference is made one wavelength of the light signal when said optical phase shifter is driven.

7. A waveguide-type optical switch as claimed in claim 2, wherein said optical phase shifter is disposed over a shorter waveguide of said two optical waveguides so that said effective optical path length difference is made zero when said optical phase shifter is driven.

8. A waveguide-type optical switch as claimed in claim 1, wherein said cross portion is disposed between said two directional couplers.

9. A waveguide-type optical switch as claimed in claim 1, wherein said two optical waveguides intersect at said cross portion with a cross angle of at least 15 degrees.

10. A waveguide-type optical switch as claimed in claim 1, wherein said two optical waveguides have tapered geometry in sections before and after said cross portion.

11. A waveguide-type optical switch as claimed in claim 1, wherein said two optical waveguides have tapered geometry at said cross portion.

12. A waveguide-type optical switch as claimed in claim 1, wherein each one of said two optical waveguides is any one of a plastic waveguide, an ion-diffused glass waveguide, and a lithium niobate waveguide.

13. A waveguide-type optical matrix switch having a plurality of input ports, and a plurality of output ports, and switching a light signal inputted to one the input ports to be produced from one of the output ports, said waveguide-type optical matrix switch comprising:
a plurality of input optical waveguides each of which is connected to each one of the input ports;
a plurality of output optical waveguides each of which is connected to each one of the output ports; and
a plurality of optical switch elements each of which is disposed at each one of intersections of said input optical waveguides and said output optical waveguides;
wherein each of said plurality of optical switch elements including:
a substrate;
two directional couplers arranged by placing two optical waveguides in close proximity at two positions on said substrate, and having an identical coupling ratio, said two optical waveguides having an effective optical path length difference of half a wavelength of the light signal between said two directional couplers;
optical path length switching means disposed over at least one of said two optical waveguides between said directional couplers for switching said effective optical path length difference to an integral multiple of the wavelength of the light signal; and
a cross portion at which said two optical waveguides are intersected.

14. A waveguide-type optical matrix switch as claimed in claim 13, wherein said optical path length switching means is an optical phase shifter.

15. A waveguide-type optical matrix switch as claimed in claim 14, wherein said optical phase shifter is a thermooptic effect phase shifter consisting of a thin film heater.

16. A waveguide-type optical matrix switch as claimed in claim 14, wherein said optical phase shifter is disposed over a shorter waveguide of said two optical waveguides so that said effective optical path length difference is made zero when said optical phase shifter is driven.

17. A waveguide-type optical matrix switch as claimed in claim 14, wherein said optical phase shifter is disposed over a longer waveguide of said two optical waveguides so that said effective optical path length difference is made one wavelength of the light signal when said optical phase shifter is driven.

18. A waveguide-type optical matrix switch as claimed in claim 13, wherein said optical path length switching means is two optical phase shifters each of which is disposed over each one of said two optical waveguides between said two directional couplers.

19. A waveguide-type optical matrix switch as claimed in claim 18, wherein one of said optical phase shifters compensates for an offset of said effective optical path length difference when said effective path length difference deviates from half a wavelength of the light signal.

20. A waveguide-type optical matrix switch as claimed in claim 13, wherein said cross portion is disposed between said two directional couplers.

21. A waveguide-type optical matrix switch as claimed in claim 13, wherein said two optical waveguides intersect at said cross portion with a cross angle of at least 15 degrees.

22. A waveguide-type optical matrix switch as claimed in claim 13, wherein said two optical waveguides have tapered geometry in sections before and after said cross portion.

23. A waveguide-type optical matrix switch as claimed in claim 13, wherein said two optical waveguides have tapered geometry at said cross portion.

24. A waveguide-type optical matrix switch as claimed in claim 13, wherein each one of said two optical waveguides is any one of a plastic waveguide, an ion-diffused glass waveguide, and a lithium niobate waveguide.

25. A waveguide-type optical matrix switch as claimed in claim 13, wherein said optical switch elements are connected by curved waveguide bundles to form a serpentine layout.

26. A waveguide-type optical switch as claimed in claim 25, wherein centers of said optical waveguides are offset at portions where each of said optical waveguides changes its geometry from a straight to a curve, and where each of said optical waveguides changes its radius of curvature, or changes its direction of a curve.

27. A waveguide-type optical matrix switch as claimed in claim 25, wherein a radius of curvature of a curve of said waveguides is at least 4 mm.

28. A waveguide-type optical matrix switch as claimed in claim 13, further comprising inactive switch elements placed at positions corresponding to said optical switch elements on said optical waveguides.

29. A waveguide-type optical matrix switch as claimed in claim 28, wherein each of said inactive switch element comprising:
two directional couplers arranged by placing two optical waveguides in close proximity at two positions on said substrate, and having an identical coupling ratio, said two optical waveguides having an effective optical path length difference of half a wavelength of the light signal between said two directional couplers; and
a cross portion at which said two optical waveguides are intersected.

* * * * *